United States Patent [19]

Namba et al.

[11] Patent Number: 5,731,982
[45] Date of Patent: Mar. 24, 1998

[54] METHOD OF GENERATING DIE STRUCTURE DATA

[75] Inventors: Takaoki Namba; Masaaki Kubota; Soichi Yamamoto, all of Sayama, Japan

[73] Assignee: Honda Giken Kogyo Kabushiki Kaisha, Tokyo, Japan

[21] Appl. No.: 630,168

[22] Filed: Apr. 11, 1996

[30] Foreign Application Priority Data

Apr. 19, 1995 [JP] Japan .................. 7-093947
Jul. 3, 1995 [JP] Japan .................. 7-167736

[51] Int. Cl.$^6$ .................. G06F 19/00; G06G 7/64; G06G 7/66
[52] U.S. Cl. .................. 364/474.24; 364/468.24; 364/472.01; 364/474.31; 364/191
[58] Field of Search .................. 364/468.24, 474.24, 364/578, 472.01, 191, 474.31; 395/22, 904

[56] References Cited

U.S. PATENT DOCUMENTS

| | | | |
|---|---|---|---|
| 4,646,251 | 2/1987 | Hayes et al. | 364/518 |
| 4,791,583 | 12/1988 | Colburn | 364/522 |
| 4,937,768 | 6/1990 | Caver et al. | 364/571.01 |
| 5,119,309 | 6/1992 | Cavendish et al. | 364/474.24 |
| 5,189,626 | 2/1993 | Colburn | 364/474.24 |
| 5,341,303 | 8/1994 | Foroudastan et al. | 364/468 |
| 5,465,221 | 11/1995 | Merat et al. | 34/474.24 |
| 5,481,465 | 1/1996 | Ioth et al. | 364/468 |
| 5,485,390 | 1/1996 | LeClair et al. | 364/474.24 |
| 5,510,995 | 4/1996 | Oliver | 364/474.24 |
| 5,532,933 | 7/1996 | Nakata | 364/474.24 |
| 5,552,992 | 9/1996 | Hunter | 364/468.25 |

FOREIGN PATENT DOCUMENTS

| | | |
|---|---|---|
| 0 346517A1 | 12/1989 | European Pat. Off. . |
| 0 547225A1 | 6/1993 | European Pat. Off. . |
| 0 610594A1 | 8/1994 | European Pat. Off. . |
| 3-123977 | 5/1991 | Japan . |
| 2050658 | 1/1981 | United Kingdom . |
| 2224371 | 5/1990 | United Kingdom . |
| 2245088 | 12/1991 | United Kingdom . |

*Primary Examiner*—Reba I. Elmore
*Assistant Examiner*—Ramesh Patel
*Attorney, Agent, or Firm*—Birch, Stewart, Kolasch & Birch, LLP

[57] ABSTRACT

Finishing allowances are given to a structure by a CAD/CAM system, and cutter path data for machining the finishing allowances are simultaneously generated. A surface finish is indicated on a die structure by a finishing mark. Finishing allowances are given to the die structure, producing a die structure with finishing allowances. Thereafter, a physical interference is confirmed on a screen image in order to generate cutter path data for a cutter head with respect to the die structure. If an interference occurs, the operator replaces a cutter with a longer cutter, and confirms again a physical interference. Cutter path data with respect to the die structure with finishing allowances can be generated substantially automatically.

7 Claims, 25 Drawing Sheets

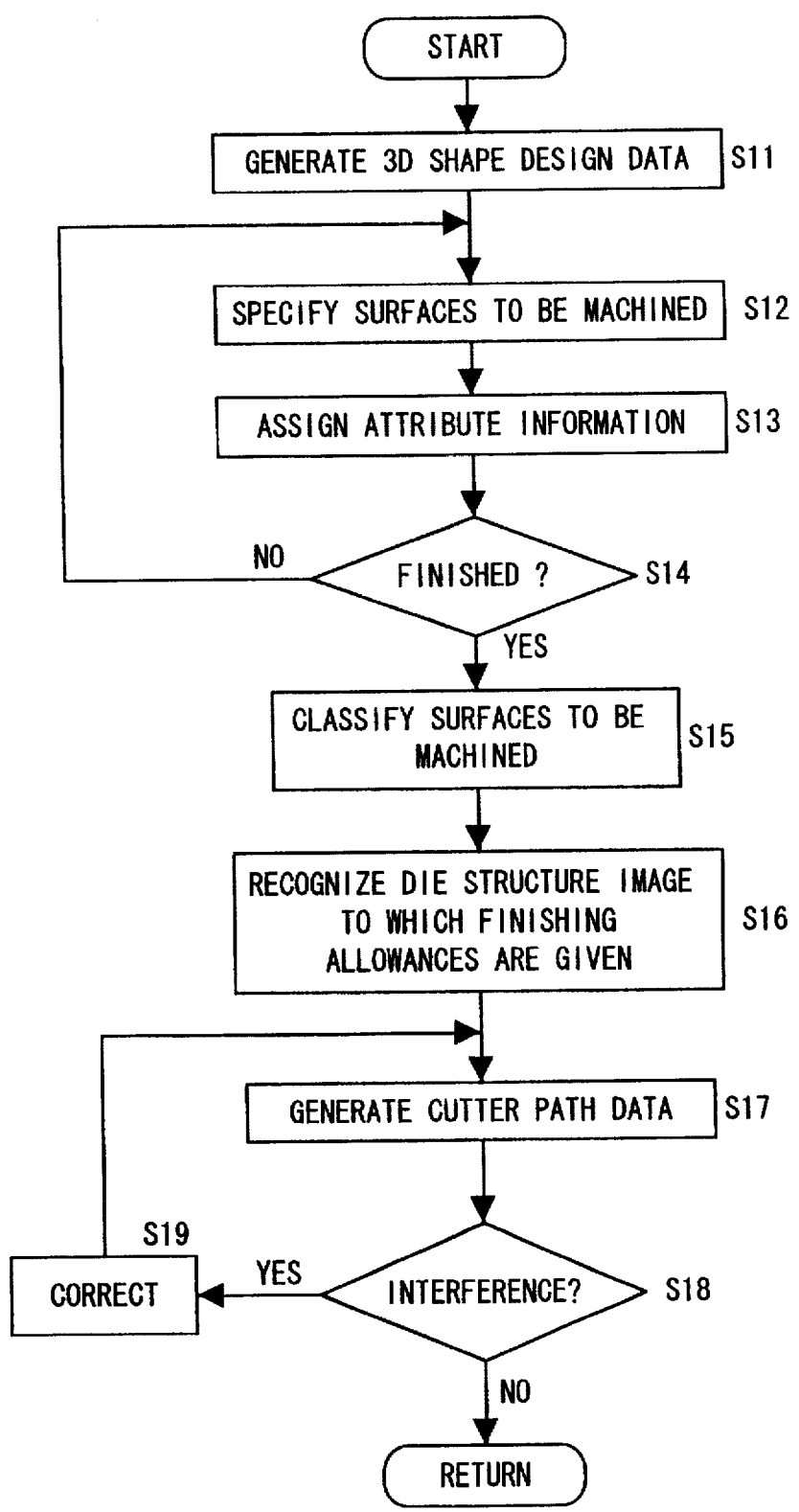

FIG. 22

ATTRIBUTE EXTRACTION

| ATTRIBUTE NAME | ATTRIBUTE VALUE | STATUS |
|---|---|---|
| ROUGHNESS 86 | ∇∇ 87 | MATCHED 88 | and ~89

☐ OUTPUT TO SCREEN
☐ SAVE TO FILE
90 ~☒ DEFINE MACRO

75 COMMANDS { OK | NEXT ITEM | CANCEL

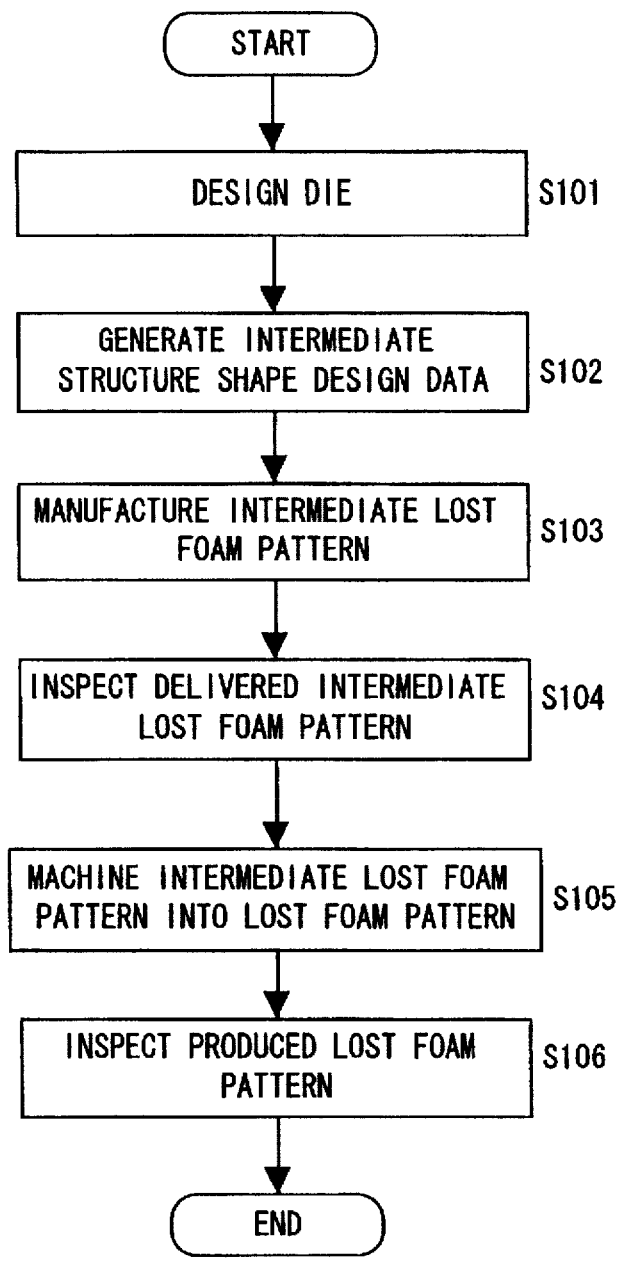

METHOD OF GENERATING DIE STRUCTURE DATA

BACKGROUND OF THE INVENTION

1. Field of the Invention

The present invention relates to a method of generating intermediate structure shape design data for producing an intermediate structure which is a lost foam pattern with a finishing allowance that is to be removed to produce a final structure as a lost foam pattern for casting a pressing die.

The present invention also relates to a method of generating cutter path data to be used by a numerically controlled (NC) machine tool for machining an intermediate structure produced from intermediate structure shape design data to remove a finishing allowance from the intermediate structure, thereby producing a final structure.

The present invention is further concerned with a method of generating die structure section data with a CAD (computer-aided design) system to produce design data for designing a new structure section corresponding to a modified product shape section which is to be supported or held by the structure section, the structure section and the product shape section jointly making up a final structure, and more particularly with a method of generating die structure section data with a CAD/CAM (computer-aided manufacturing) system to produce design data for designing a die structure section of a pressing die structure, which is composed of the die structure section and a product shape forming section for pressing a workpiece to a predetermined product shape.

2. Description of the Related Art

Large-size formed sheet steel members such as automotive outer side panels that are mass-produced, for example, are produced by a pressing die comprising upper and lower die members.

For casting such a pressing die comprising upper and lower die members, it is the general practice to produce a mold according to investment casting with a lost foam pattern made of foamed polystyrene or the like which is not required to be pulled out of the mold and hence can be shaped with great freedom. Consequently, a process of producing such a lost foam pattern is indispensable for casting a pressing die.

One conventional process of forming a lost foam pattern will be described below with reference to FIG. 24 of the accompanying drawings. According the process shown in FIG. 24, design data for designing a pressing die are generated by a known CAD system in a step S101. The generated design data include data representing a finishing mark which indicate a finished condition of a surface. The step S101 is usually carried out by a CAD system in the production technology developing department of an automobile manufacturer, and may be referred to as a die design step.

The design data generated in the die design step S101 are supplied as final structure shape design data corresponding to a final lost foam pattern to an intermediate lost foam pattern production department (which may also be referred to as a "primary production department") for producing an intermediate lost foam pattern, which means a final lost foam pattern with a finishing allowance. In the intermediate lost foam pattern production department, intermediate structure shape design data are generated for producing an intermediate lost foam pattern in a step S102.

The intermediate lost foam pattern production department is usually run by a professional manufacturer different from the automobile manufacturer. The professional manufacturer refers to design drawings based on the final structure shape design data, and adds manufacturing conditions such as a finishing allowance corresponding to the finishing mark to the final structure shape design data according to its own design standards and know-how on a CAD system of its own, thereby generating intermediate structure shape design data to be used solely by the professional manufacturer.

Referring to drawings based on the intermediate structure shape design data thus generated, the professional manufacturer manufactures a final lost foam pattern with a finishing allowance, i.e., an intermediate lost foam pattern, in a step S103. Specifically, if the lost foam pattern to be finally produced is designed for the production of automotive outer side panels, then an intermediate lost foam pattern is manually carved out of a considerably large workpiece in the form of a rectangular parallelepiped having sides each of a few meters.

The manufactured intermediate lost foam pattern is then delivered from the professional manufacturer to the production technology developing department of the automobile manufacturer. In the production technology developing department or an inspection department of the automobile manufacturer, the delivered intermediate lost foam pattern is inspected in a step S104. In the step S104, specifically, actual dimensions, i.e., dimensions including the finishing allowance, of the intermediate lost foam pattern, and dimensions, i.e., dimensions not including the finishing allowance, indicated in the design drawings based on the final structure shape design data produced in the production technology developing department are inspected, and the appearance of the intermediate lost foam pattern is visually inspected. In the inspecting step S104, the production technology developing department can know for the first time the values of the finishing allowance of the intermediate structure, i.e., the intermediate lost foam pattern.

The values of the finishing allowance which have been obtained from the intermediate structure that has passed the inspection are incorporated into the final structure shape design data by the CAD system, thus producing final structure shape design data with the finishing allowance. The final structure shape design data with the finishing allowance are then supplied to a known CAM system, which generates cutter path data for an NC machine tool. Generally, the CAM system and the NC machine tool share a common hardware system and also share data.

Based on the generated cutter path data, the NC machine tool finishes the intermediate structure, i.e., the intermediate lost foam pattern, into a final structure, i.e., a final lost foam pattern, which is free from the finishing allowance, in a step S105.

Dimensions of the final structure produced by the NC machine tool are manually measured by the operator with a three-dimensional measuring machine or the like. The operator checks in a step S106 whether the measured dimensions agree with the dimensions in the design drawings based on the final structure shape design data produced by the production technology developing department. If the measured dimensions agree with the dimensions in the design drawings, then the final lost foam pattern is completed as the final structure represented by the final structure shape design data.

In the above conventional process of forming a lost foam pattern, the department for generating final structure shape design data for a lost foam pattern, e.g., the production technology developing department of the automobile manufacturer, and the department for manufacturing an intermediate lost foam pattern based on the final structure shape design data, e.g., the professional manufacturer, are not closely related to each other from a technological standpoint.

More specifically, in the conventional process, desired final structure shape design data are generated according to certain upstream design standards, and then an intermediate structure to which manufacturing conditions have been added according to downstream design standards different from the upstream design standards is manufactured based on the final structure shape design data. Thereafter, the intermediate structure is machined into a desired final structure based on the upstream design standards again. This process has caused the following various problems:

First, since a finishing allowance, etc. is manually entered in the generation of design data for manufacturing the intermediate structure, data entry errors are highly likely to occur. Such data entry errors tend to be introduced particularly if the intermediate structure is composed of a plurality of joined sections. Furthermore, if the intermediate structure is composed of a plurality of joined sections, then it is time-consuming to complete the intermediate structure. As a result, it is highly expensive to manufacture the intermediate structure.

Secondly, in the inspecting step S104, the manufactured intermediate structure is compared with the design data for producing a final structure which has been generated according to the upstream design standards. Therefore, it is only possible to determine whether the finishing allowance is actually included or not in the inspecting step S104. However, it is not possible to determine whether the finishing allowance itself or the manner in which it is added is adequate or not with respect to the direction in which it will subsequently be machined. Accordingly, the next step of machining the intermediate structure into a desired final structure based on the upstream design standards takes more time than necessary.

Thirdly, in the machining step S105, the intermediate structure is machined by the NC machine tool. When machining data to be supplied to the NC machine tool are generated by the CAM system, attribute data including the finishing allowance which are obtained in the inspecting step S104 are manually entered. Therefore, the entry of such attribute data is time-consuming.

Fourthly, in the inspecting step S106, the final lost foam pattern is measured for its dimensions by the three-dimensional measuring machine, and thereafter the operator visually compares the measured dimensions with the dimensions in the design drawings based on the final structure shape design data. Consequently, the inspecting step S106 is composed of a large number of visually verifying steps and is time-consuming.

According to the conventional process of manufacturing an intermediate structure, if a defect occurs either one of the steps S102 through S106, then the subsequent steps will greatly be adversely affected by the defect.

As is well known in the art, a pressing die is basically constructed of upper and lower die members. As shown in FIG. 25 of the accompanying drawings, each of the upper and lower die assemblies, provide a die structure 1 basically comprises a product shape forming section 2 for pressing a sheet-like workpiece to a predetermined product shape and a die structure section (which may also be referred to as a "die structure") 3 which holds the product shape forming section 2.

The die structure section 3 has die parts including guide posts 4 for combining the upper and lower die members with each other, scrap cutters for cutting off undesirable portions of the workpiece, cams for forming bent portions of the workpiece, and urethane springs or pads for applying a uniform pressure to the workpiece. That portion of the die structure 1 exclusive of the above die parts has been manufactured by a mold using the completed lost foam pattern referred to above.

The die structure 1 shown in FIG. 25 serves to form an outer side panel of a four-wheel automobile having four doors. Therefore, the product shape forming section 2 is basically defined by an outer shape definition line 5 and door shape definition lines 6, 7.

The die structure 1 is designed by a commercially available CAD/CAM system which is well known in the art. For designing the die structure 1, as shown in FIG. 26 of the accompanying drawings, product shape data Da which have been prepared by another product designing CAD/CAM system are supplied from a host computer (not shown) through an input port 8 to a die structure designing CAD/CAM system 9. The CAD/CAM system 9 automatically generates data Db for the product shape forming section 2, hereinafter referred to as "product shape forming section data Db", based on the product shape data Da. The product shape forming section data Db are generated based on the product shape data Da, taking into account the thickness of the workpiece and information indicative of whether the die structure 1 is an upper die member or a lower die member.

The product shape forming section data Db which are generated comprise three-dimensional position coordinate (XYZ position coordinate) data representing dimensions from a reference point (origin) 0 (see FIG. 25) of the product shape, e.g., the center of the product shape. However, since the Z position coordinate data, i.e., coordinate data in a direction normal to the sheet of FIG. 25, are ancillary to two-dimensional position coordinate (XY position coordinate) data, the product shape forming section data Db will be described below as two-dimensional position coordinate data for an easier understanding of the present invention.

After the product shape forming section data Db have been generated by the CAD system 9, data for designing the die structure section 3, i.e., die structure section data Dc, are manually generated.

The die structure section data Dc are generated as two-dimensional position coordinate data (actually, three-dimensional position coordinate data) representing dimensions from the origin 0. For example, in FIG. 25, die structure section data Dc of an upper right point Q on the die structure section 3 are generated as Dc=Q (A, B). Similarly, three-dimensional position coordinate data of the die parts including the guide posts 4, the scrap cutters, the cams, and the urethane springs of the die structure section 3 are generated. For either one of the upper and lower die members for forming the outer side panel as shown in FIG. 25, the die structure section data Dc need to comprise data representing more than 2000 points. The die structure section data Dc are manually entered by a dedicated operator according to certain die structure design standards, and hence is considerably time-consuming.

The product shape forming section data Db and the die structure section data Dc which are generated as described above jointly make up die structure data Dd. The die structure data Dd are supplied to a known CAM system through an output port 10.

Based on the supplied die structure data Dd, the CAM system generates cutter path data, i.e., CL (cutter location) data, for the die structure 1. Based on the CL data, an NC machine tool automatically manufactures the die structure 1 for its most part, thereby completing a pressing die composed of upper and lower die members.

When a new product shape is determined because of the development of a new product or a product model change, a new die structure for forming such a new product shape is required, making it necessary to generate new die structure data for manufacturing such a new die structure.

The generation of die structure section data is considerably time-consuming because they are manually entered by a dedicated operator according to certain die structure design standards, as described above. If the die structure section data which have already been generated can be used as die structure section data for different products (different product types), then the number of steps required to generate die structure section data may be reduced.

One conventional effort to generate die structure data is disclosed in Japanese laid-open patent publication No. 3-123977 entitled "Method of correcting parts positions in die design." According to the disclosed method, four corner positions on a die structure section (which is referred to as a die plate in the publication) or representative points on a part disposed on a die structure section are established as reference points, and the position where the part is to be disposed is determined by specifying relative positions from the reference points. As the reference points move, the position of the part located with respect to the reference points is varied. The disclosed method dispenses with complex calculations and data entry operation when the position of a part, such as a guide pin or a sleeve, which has a certain mutual relationship to the four corner positions is to be varied.

However, the conventional method gives no consideration whatsoever to the location of parts related to a product shape, e.g., the die parts described above including scrap cutters, cams, and urethane springs, and only automatizes the designing process for a portion of the die structure section.

SUMMARY OF THE INVENTION

It is therefore an object of the present invention to provide a method of generating structure section data, e.g., die structure section data, to allow a CAD/CAM system to generate a structure section, e.g., a die structure section, in its entirety depending on a product shape such as a product type shape when the product shape is varied.

Another object of the present invention is to provide a method of generating intermediate structure shape design data easily from final structure shape design data for an intermediate structure to be manufactured.

Still another object of the present invention is to provide a method of easily generating accurate and reliable cutter path data for machining an intermediate structure which has been manufactured using intermediate structure shape design data, into a structure having a desired final shape.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 12 is a flowchart of an operation sequence of a process of designing a die with the CAD/CAM system shown in FIG. 1;

FIG. 22 is a view of a screen image of an attribute extraction window;

FIG. 24 is a flowchart of a process of designing, manufacturing, and inspecting a structure which comprises a lost foam pattern;

DETAILED DESCRIPTION OF THE PREFERRED EMBODIMENTS

Figure 25:
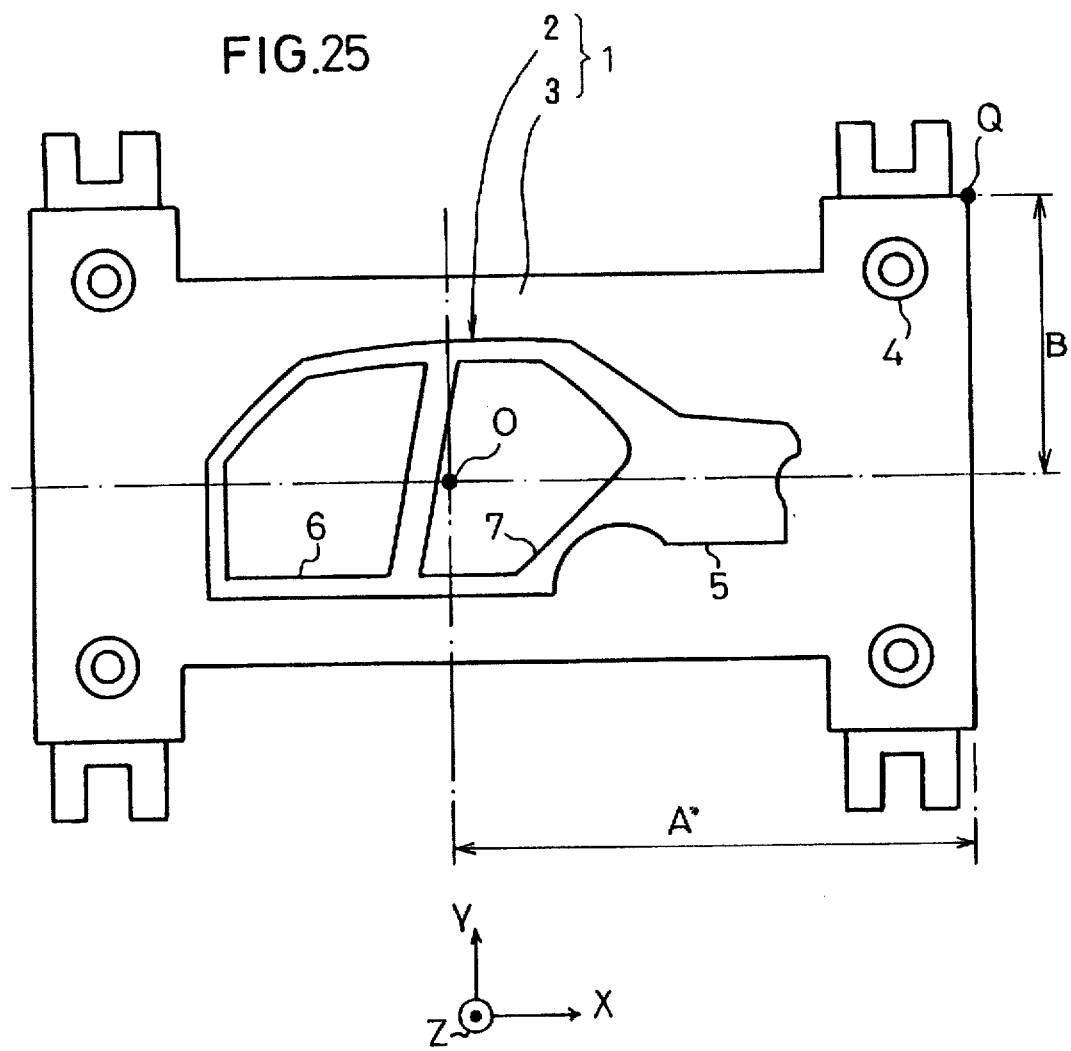
FIG. 25 is a view illustrating a conventional process of a die structure.
Figure 26:
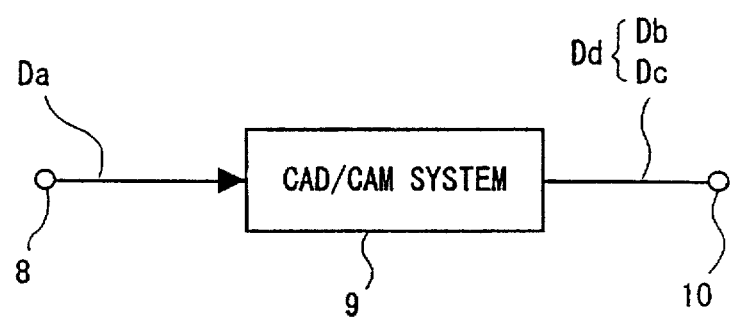
FIG. 26 is a block diagram of a general CAD/CAM system for designing a die structure.

Those parts shown in FIGS. 1 through 10 which are identical to those shown in FIGS. 25 and 26 are denoted by identical reference numerals, and will not be described in detail below. The present invention will be described also with reference to FIGS. 25 and 26.

Figure 1:
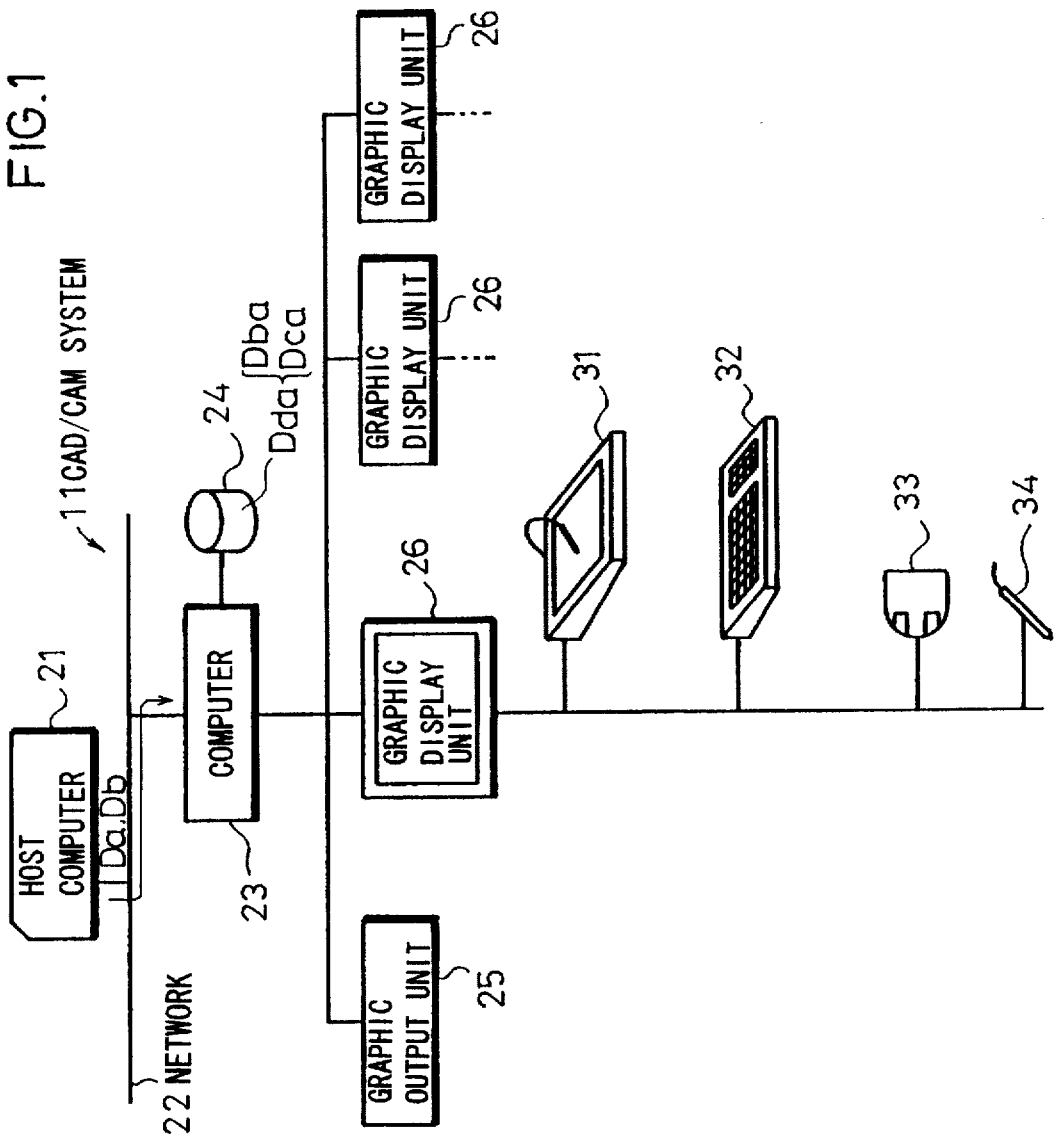
FIG. 1 is a block diagram of a CAD/CAM system which carries out a method according to the present invention.

FIG. 1 shows a general arrangement of a CAD/CAM system 11 which carries out a method according to the present invention.

As shown in FIG. 1, the CAD/CAM system 11 is connected to a host computer 21 through a network 22 such as Ethernet. The CAD/CAM system 11 comprises a computer 23 having a central processing unit for effecting graphic calculations and managing a display control database, a mass storage unit 24 such as an optical disk or the like for storing and updating a large amount of graphic information, a graphic output unit 25 such as an XY plotter or the like, a plurality of graphic display units 26 serving as central devices for interaction between the CAD/CAM system 11 and users and usable in connection with input devices including a tablet 31 having a stylus pen, a keyboard 32, a mouse 33, and a light pen 34 which are connected to each of the graphic display units 26.

The computer 23 contains an operating system, a system software program, an application software program for generating shape design data for CAD and finishing allowance data, and an application software program for confirming cutter data for CAD and cutter interference and generating cutter path data (CL data). The cutter path data can easily be converted into NC machining data represented by G codes.

Figure 2:
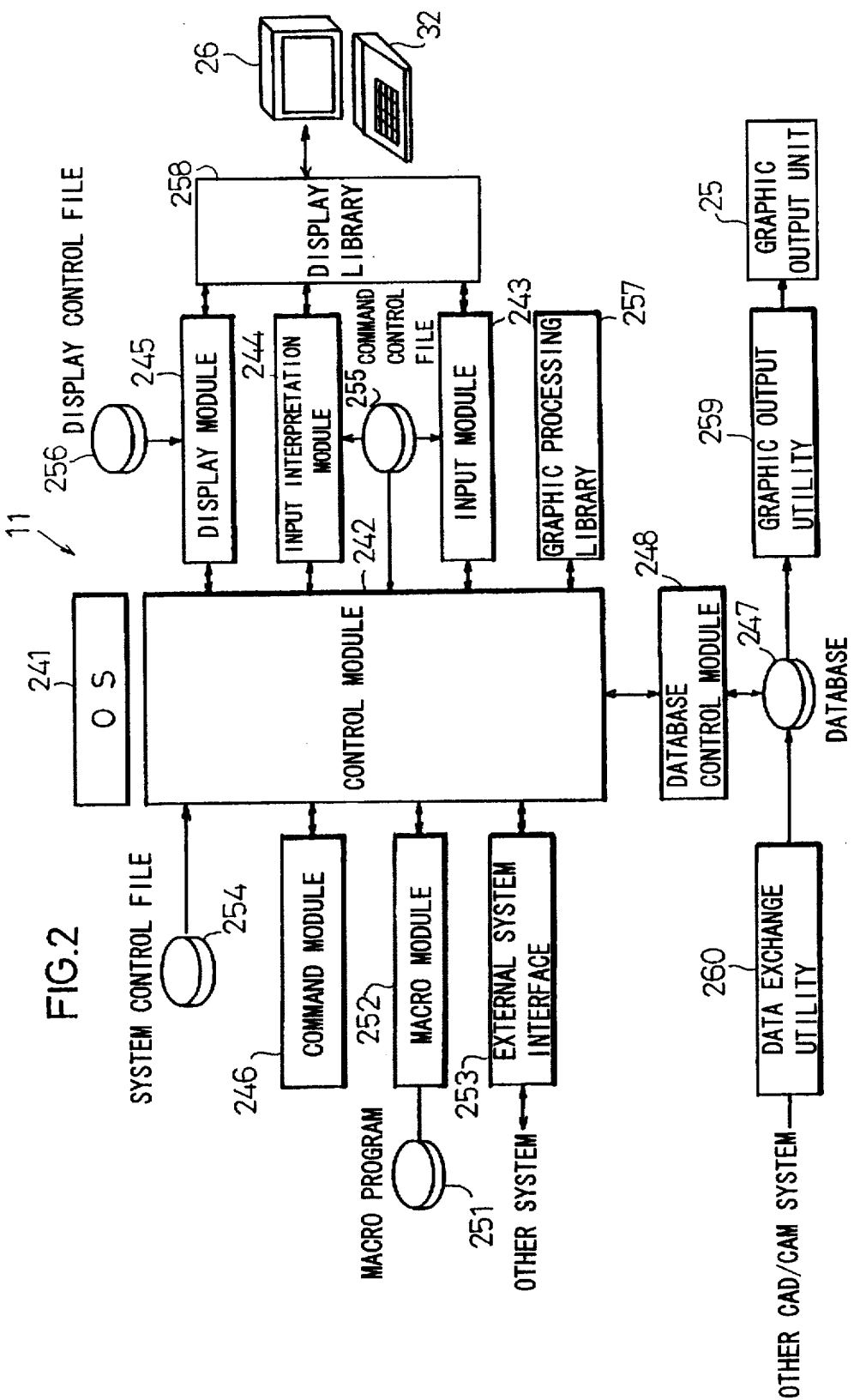
FIG. 2 is a block diagram of program modules in the CAD/CAM system shown in FIG. 1.

The CAD/CAM system 11 also has a number of general-purpose programs as shown in FIG. 2. These programs can be classified into the following program modules according to their function:

(a) An operating system 241 and a control module 242 for controlling processing and information flow in the CAD/CAM system 11.

(b) An input module 243 for assisting the various input devices, e.g., the keyboards 32, in entering information smoothly.

(c) An input interpretation module 244 for interpreting input information according to types of commands.

(d) A display module 245 for managing display information and displaying information according to commands.

(e) A command module 246 for processing graphic information according to commands composed of submodules corresponding to commands.

(f) A database control module 248 for efficiently retrieving and storing a large amount of information in a database 247 provided by the mass storage unit 24 required by the CAD/CAM system 11.

(g) A macro module 252 for executing a macro program 251 including an automatic design program.

(h) An external system interface 253 for exchanging information with and coacting with other CAD/CAM systems.

The CAD/CAM system 11 also has auxiliary files including a system control file 254 for storing system configurations and standard values to maintain system extensibility and maintenability, a command control file 255 for storing command operability and a program control procedure, and a display control file 256 for storing types and configurations of the graphic display units 26. The CAD/CAM system 11 further has auxiliary libraries and utilities including a graphic processing library 257 for processing graphic information, a display library 258 for displaying graphic information on the graphic display units 26, a graphic output utility 259 for outputting processed graphic information to the graphic output unit 25, and a data exchange utility 260 for connecting the CAD/CAM system 11 to other CAD/CAM systems which are connected to the host computer 21.

Each of the above program modules will briefly be described below.

The control module 242 converts programs into program modules, and is interposed between the program modules for effecting centralized management of controlling within the system and standardizing calling procedures. The control modules 242 has functions to start and finish operation of the system, process malfunctions of the system, control the execution of each of the program modules, record a history of program module executions, debug the program modules, and carry out special processes with the operating system 241.

The input module 243 provides the user with a comfortable input procedure according to organized and unified specifications of various input methods of the various input devices. The input module 243 has functions to prompt the user to indicate the type and the input method of, and the input device for, information to be inputted, select an input device, and convert the type of input information into a standard type.

The input interpretation module 244 unifies the methods of interpreting input information and patterns of display of results for thereby supporting a variety of input indicating methods to improve input operability and maintain system extensibility. The input interpretation module 244 has functions to interpret input information and display interpreted results.

The display module 245 processes various display operation requests in a unified manner, and manages display information and display conditions.

The command module 246 uniformly manages the types of input arguments, the calling of processing programs according to commands, and the methods of processing results, and keeps system maintenability and extensibility.

The database control module 248 standardizes the methods of requesting from other program modules, and provides a means for recovery upon the occurrence of a fault. The database control module 248 has functions to manage the status of use of the database 247, operate the database 247, and process a fault that has occurred to the database 247.

The external system interface 253 standardizes exchanges of information with other systems for effective utilization of the CAD/CAM system 11. The external system interface 253 has functions to exchange information with external systems and control operation of external programs.

The macro module 252 controls the operation of the CAD/CAM system 11 according to the macro program 251. The macro module 252 has a function to interpret and execute the macro program 251.

A method according to the present invention can be carried out by the CAD/CAM system 11 which is constructed as described above. In the following description of the method according to the present invention, the CAD/CAM system 11 will not be referred to unless specifically required.

Figure 3:
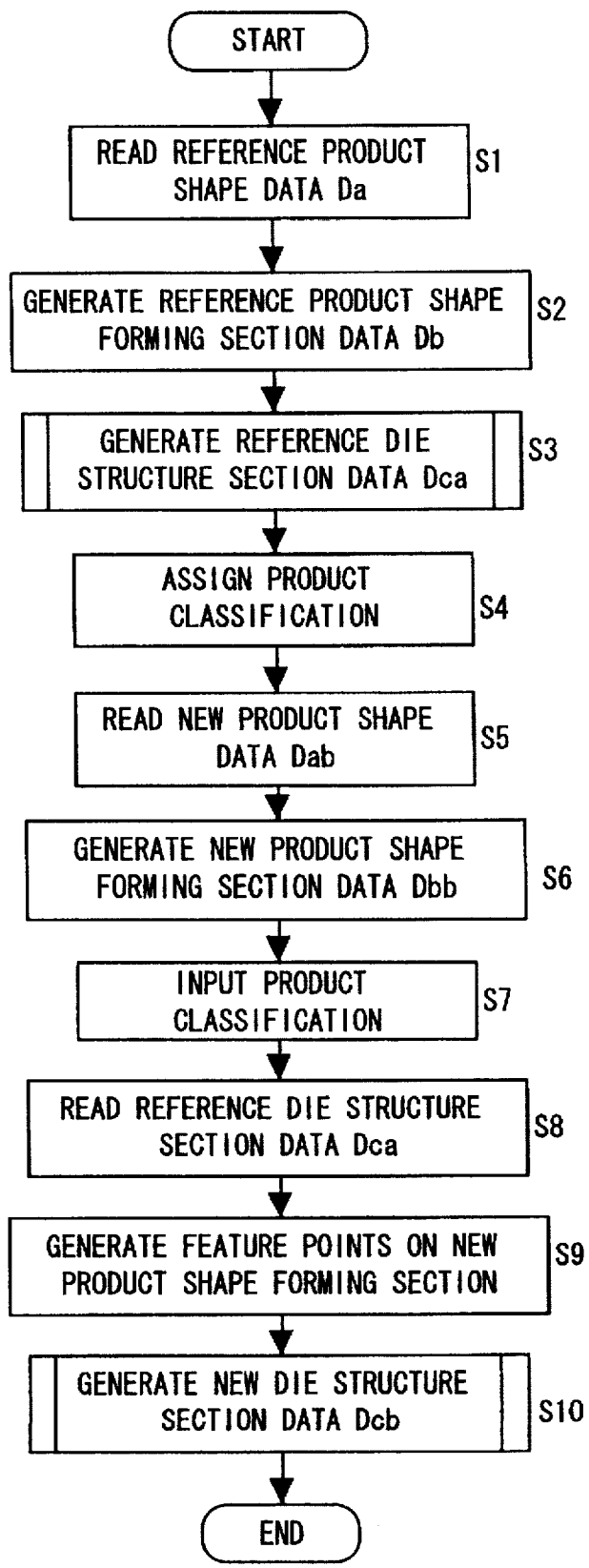
FIG. 3 is a flowchart of an operation sequence of the method according to the present invention.

An operation sequence of the method according to the present invention will be described below with reference to FIG. 3. The operation sequence shown in FIG. 3 is performed primarily under the control of the computer 23 shown in FIG. 1. For an easier understanding of the operation sequence of the method according to the present invention, it is assumed that a product shape section is a product shape forming section for a pressing die, a structure section is a die structure section for holding the product shape forming section, and a structure is a die structure comprising a product shape forming section and a die structure section for holding the product shape forming section.

Reference product shape data Da (identical to the product shape data Da shown in FIG. 26) which have been generated by another CAD/CAM system are read from the host computer 21 in a step S1.

Based on the read reference product shape data Da, the CAD/CAM system 11 generates design data (hereinafter referred to as "reference product shape forming section data") Db (see FIG. 26) for designing a reference product shape forming section 2 (see FIG. 25) which serves as a reference for producing a die structure 1 (see FIG. 25) in a step S2. As described above in the Description of the Related Art, the product shape forming section data Db are generated based on the reference product shape data Da, taking into account the thickness of the workpiece and information indicative of whether the die structure 1 is an upper die member or a lower die member. For forming an outer side panel of a four-wheel automobile having four doors, the reference product shape forming section 2 is basically defined by a reference outer shape definition line 5 and reference door shape definition lines 6, 7, as described with reference to FIG. 25.

The reference product shape forming section data Db which are generated comprise three-dimensional position coordinate data representing dimensions from a reference point (origin) 0 (see FIG. 25) of the reference product shape, e.g., the center of the reference product shape.

Then, design data (hereinafter referred to as "reference die structure section data") Dca for designing a reference die structure section 3 (see FIG. 25) are generated in a step S3. The reference die structure section data Dca are data inherent in the present invention.

Figure 4:
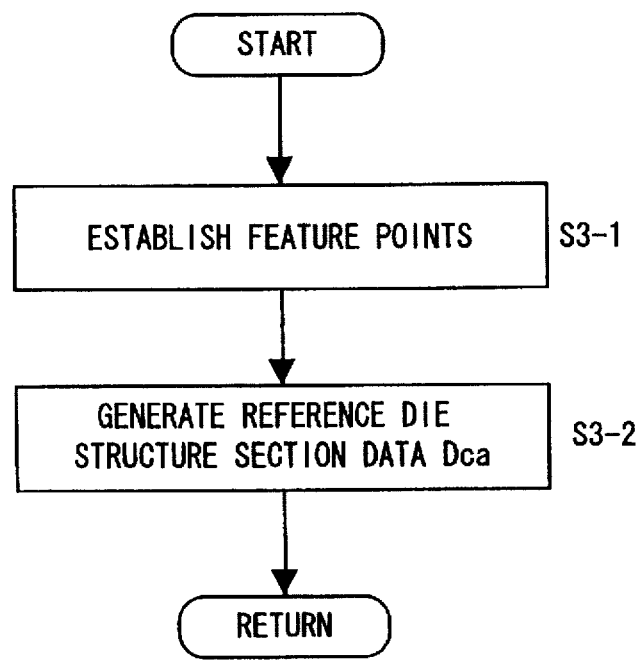
FIG. 4 is a detailed flowchart of a step S3 of the operation sequence shown in FIG. 3.
Figure 5:
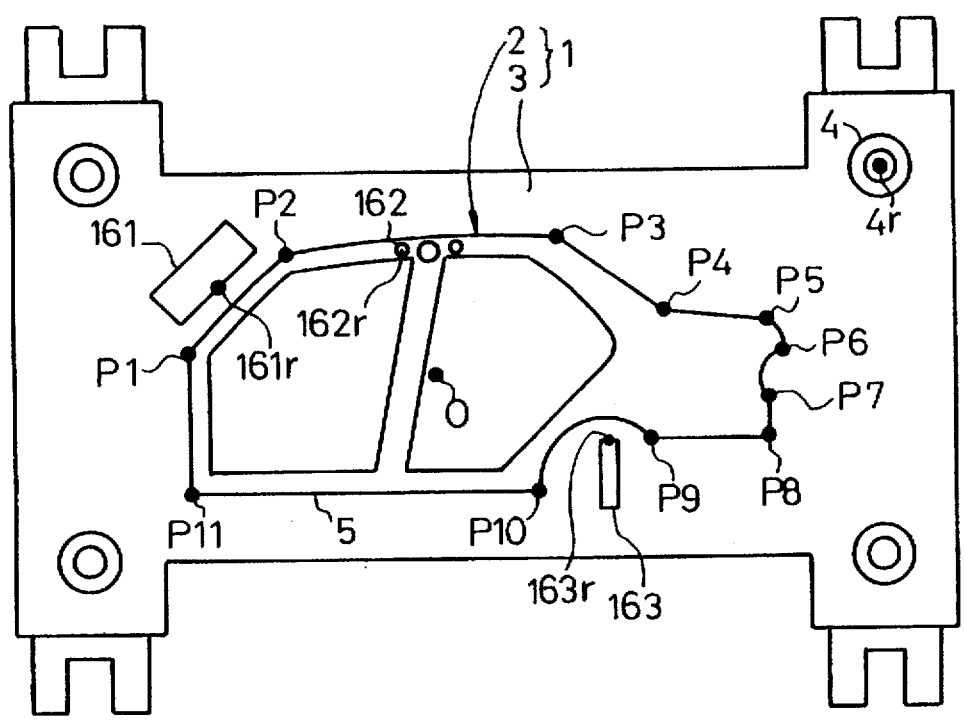
FIG. 5 is a view illustrating a reference die structure related to a reference product shape.

Details of the step S3 are shown in FIG. 4. As shown in FIG. 4, feature points or control points CP on a product shape are established in a step S3-1. As shown in FIG. 5, the feature points CP are generated as points capable of substantially reproducing the product shape through interpolation such as linear interpolation or circular interpolation. If the product shape is classified as an outer side panel of a four-wheel automobile having four doors as shown in FIG. 5, then eleven feature points CP=P1~P11 are established on the reference outer shape definition line 5.

The reference die structure section data Dca are generated as data defined by one of the feature points P1~P11 or a combination of close feature points thereof in a step S3-2.

The generation of reference die structure section data Dca with respect to a guide post 4, a cam 161, a urethane spring 162, and a scrap cutter 163 which are structure parts of the reference die structure section 3 will be described below. In FIG. 5, all of four guide posts 4 disposed on the reference die structure section 3 are shown, but only one of cams 161, one of urethane springs 162, and one of scrap cutters 163 are shown.

Data representing product shapes of the guide post 4, the cam 161, the urethane spring 162, and the scrap cutter 163 are stored as product shape data of their standard parts in the CAD/CAM system 11. With respect to the product shape data, positional relationships, e.g., relationship equations, are described in relation to the coordinates of respective part origins $4r$, $161r$, $162r$, $163r$ of the guide post 4, the cam 161, the urethane spring 162, and the scrap cutter 163. Therefore, the positions of these parts can automatically be specified when only the coordinates of the part origins $4r$, $161r$, $162r$, $163r$ are indicated.

Figure 6:
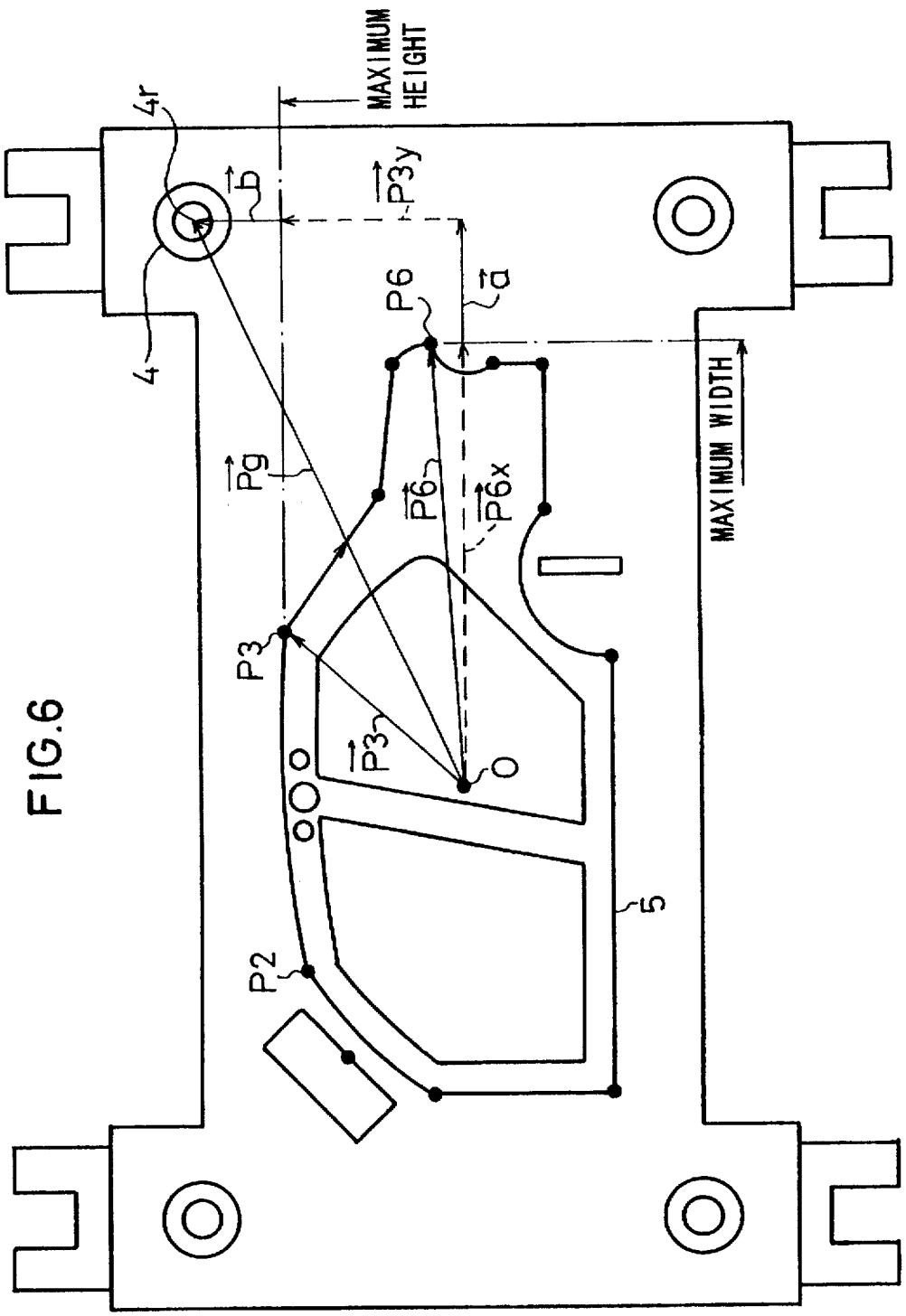
FIG. 6 is a view illustrating dimensions between feature points and a die structure section (guide post)
Figure 7:
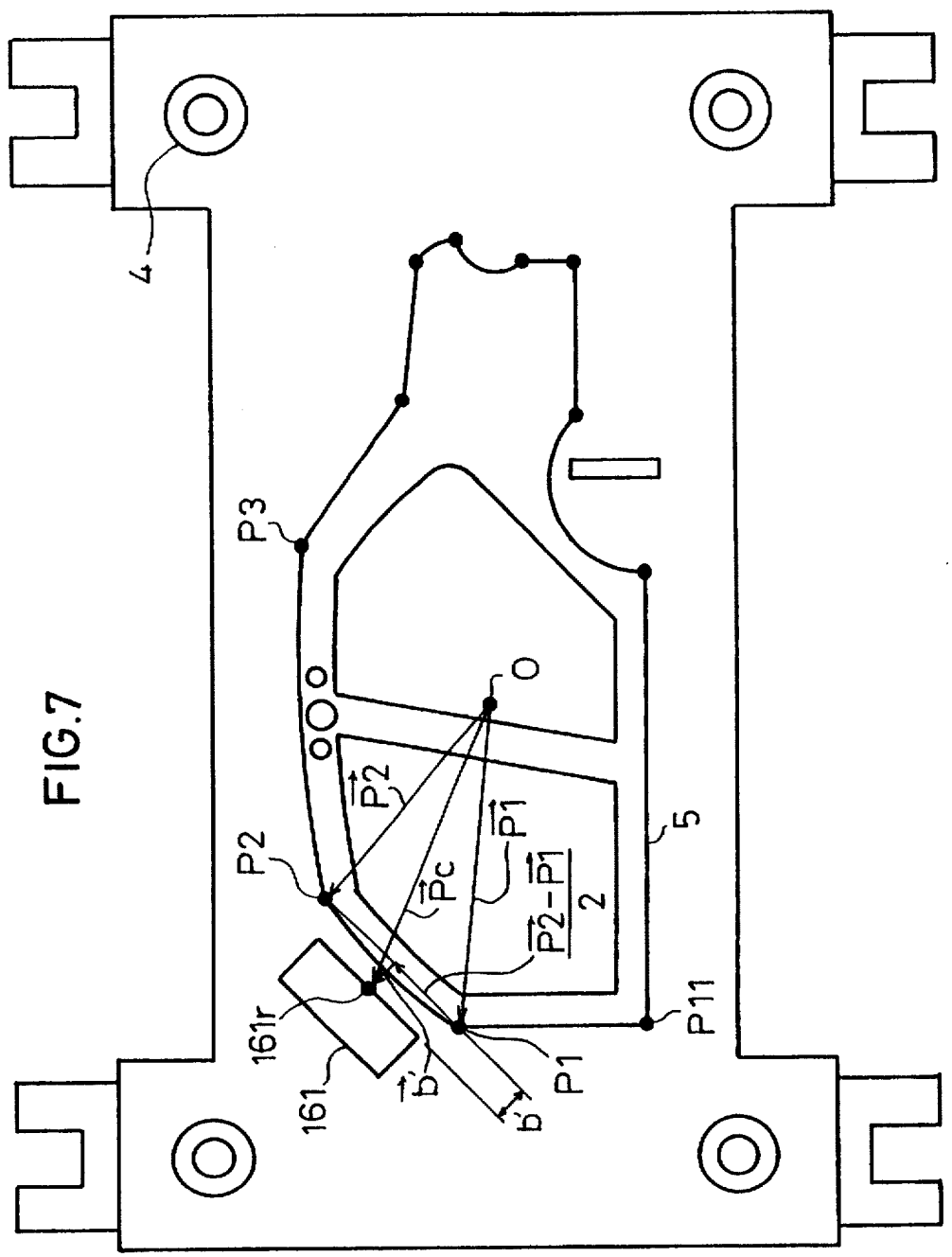
FIG. 7 is a view illustrating dimensions between feature points and a die structure section (cam)
Figure 8:
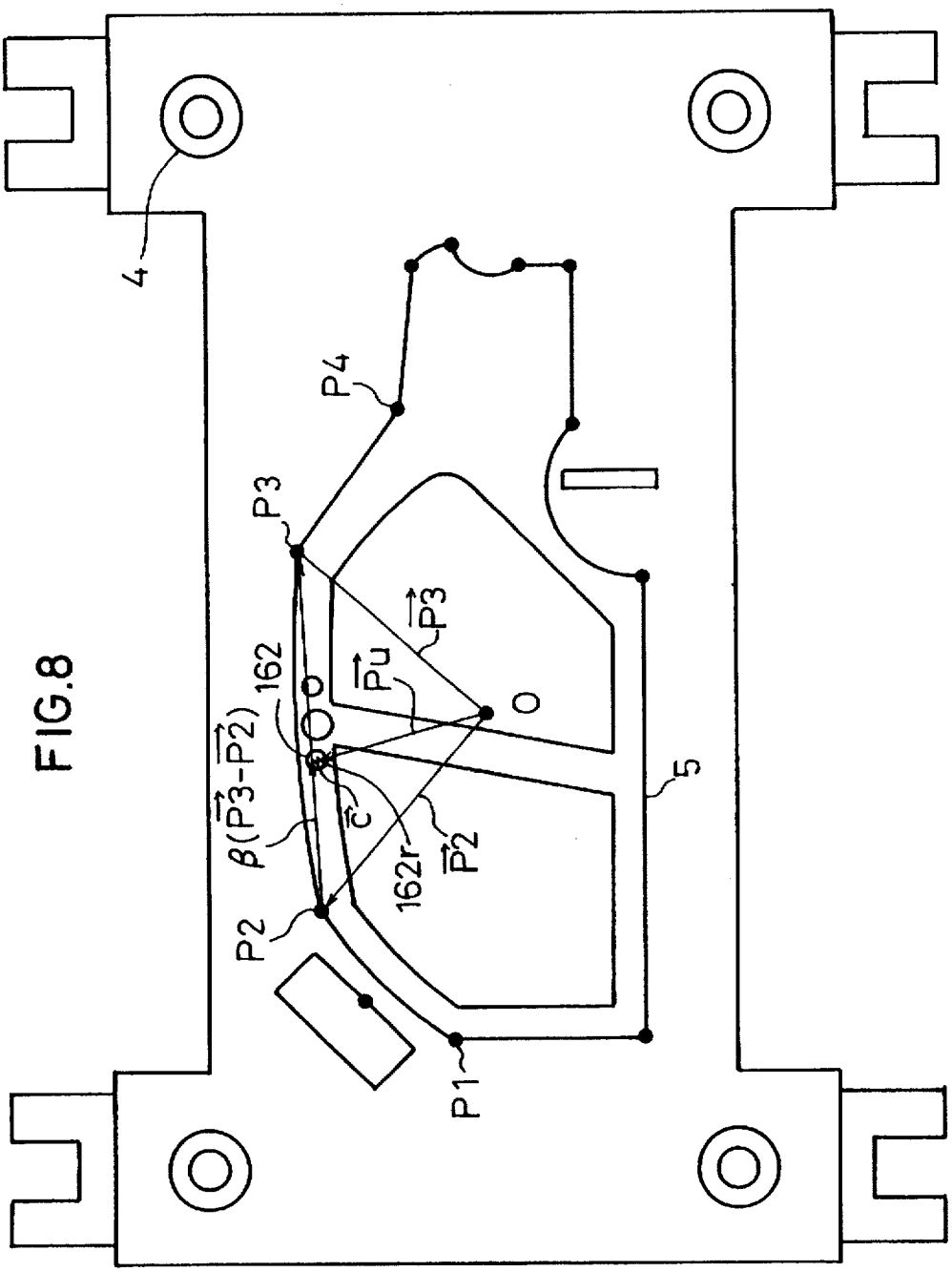
FIG. 8 is a view illustrating dimensions between feature points and a die structure section (urethane spring)

For an easier understanding of the present invention, the description of dimensions (actually the description of a plurality of three-dimensional position coordinates) relative to the reference die structure section data Dca of the guide post 4, for example, among the die structure parts is represented by a vector Pg shown in FIG. 6. The vector Pg has a start point at the origin O and an end point at the part origin $4r$ of the guide post 4. It can easily be understood that the vector Pg can be obtained from a vector Pgx of its X component and a vector Pgy of its Y component according to the following equation (1):

$$\text{Vector } Pg = \text{vector } Pgx + \text{vector } Pgy \quad (1)$$
$$= \text{vector } Px + \text{vector } a + \text{vector } P3y + \text{vector } b.$$

In the equation (1), the vector $P6x$ is the vector of an X component of a vector P6 having a start point at the origin O and an end point at the feature point P6, and the vector P3y is the vector of a Y component of a vector P3 having a start point at the origin O and an end point at the feature point P3.

The part origin 4r of the guide post 4 is defined using a constant vector a indicative of an outward offset along an X-axis from a maximum width of the product shape which is defined by the outer shape definition line 5, i.e., an outward offset along the X-axis from the feature point P6 in FIG. 6, and a constant vector b indicative of an outward offset along a Y-axis from a maximum height of the product shape, i.e., an outward offset along the Y-axis from the feature point P3.

If the vector Pg is represented by scalar coordinates (Pgx, Pgy), then the scalar coordinates (Pgx, Pgy) can be expressed by (Pgx, Pgy)=(P6x+a, P3y+b). The values a, b are predetermined values, and the values P6x, P3y can easily be calculated from the vectors P6, P3 up to the feature points P6, P3.

As can be understood from the right-hand side of the equation (1), the reference die structure section data Dca of the guide post 4 are established as data described (represented) by relative dimensions (relationship equation) with the two feature points P3, P6 used as reference points.

Similarly, it can be seen that a vector Pc representing the cam 161 can be expressed by a vector according to the following equation (2) (see FIG. 7):

$$\text{Vector } Pc = \text{vector } P1 + \{(\text{vector } P2 - \text{vector } P1)\}/2\} + \text{vector } b'. \quad (2)$$

Thus, reference die structure section data Dca of the cam 161 are established as data represented by relative dimensions (relationship equation) with the feature points P1, P2 used as reference points.

It can also be seen that a vector Pu representing the urethane spring 162 can be expressed according to the following equation (3) (see FIG. 8):

$$\text{Vector } Pu = \text{vector } P2 + \beta(\text{vector } P3 - \text{vector } P2) + \text{vector } c \quad (3)$$

where β is a constant.

Thus, reference die structure section data Dca of the urethane spring 162 are established as data represented by relative dimensions (relationship equation) with the feature points P2, P3 used as reference points.

Reference die structure section data Dca of the scrap cutter 163, whose equation is omitted here, are established as data represented by relative dimensions (relationship equation) with the feature points P9, P10 (see FIG. 5) used as reference points.

All the reference die structure section data Dca of the reference die structure section 3 in the step S3 are generated in the manner described above.

Then, a product classification is assigned to the generated reference die structure section data Dca in a step S4. A product classification is assigned in order to provide a reference for determining data similarity when new die structure section data relative to a new product shape are to be generated. In this case, a product classification "(Outer side panel of) four-door automobile" is assigned to the generated reference die structure section data Dca.

Other product classifications include "(Outer side panel of) two-door automobile," "(Outer side panel of) three-door hatchback," "(Outer side panel of) five-door hatchback," and "(Outer side panel of) five-door station wagon," etc. Actually, product classifications are assigned when reference product shape data Da are generated.

The reference die structure section data Dca to which the product classification has been assigned are stored, and the product shape forming section data Db are stored as die structure data Dd in the mass storage unit 24 (see FIG. 1).

Then, product shape data (hereinafter referred to as "new product shape data") Dab (see FIG. 1), which have been generated by another CAD/CAM system, of a new product for which new die structure section data are to be generated are read from the host computer 21 in a step S5.

Based on the read new product shape data Dab, the CAD/CAM system 11 automatically generates design data (hereinafter referred to as "new product shape forming section data") Dbb for designing a new product shape forming section 2b (described later on) which constitutes a new die structure 1b (described later on) in a step S6.

Then, a product classification for the new product is entered in a step S7. Actually, the product classification is automatically entered as it is index data ancillary to the new product shape forming section data Dbb.

If the entered product classification is "four-door automobile," then the data stored in the mass storage unit 24 are searched using the entered product classification as an index (keyword), and the graphic display unit 26 displays the type name of the product classification "four-door automobile" and the die structure data Da which comprises the reference die structure section data Dca and the reference product shape forming section data Db.

When the displayed reference die structure section data Dca are indicated by the keyboard 32, the reference die structure section data Dca are read into the database 247 in a step S8.

Figure 9A:
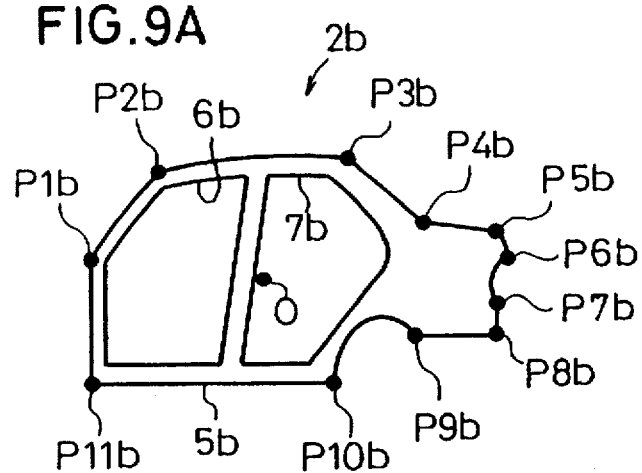
FIG. 9A is a diagram illustrating the generation of feature points on a new product shape.

FIG. 9A shows the new product shape forming section 2b which is produced by the new product shape data Dab and essentially represented by an outer shape definition line 5b and door shape definition lines 6b, 7b.

Figure 9B:
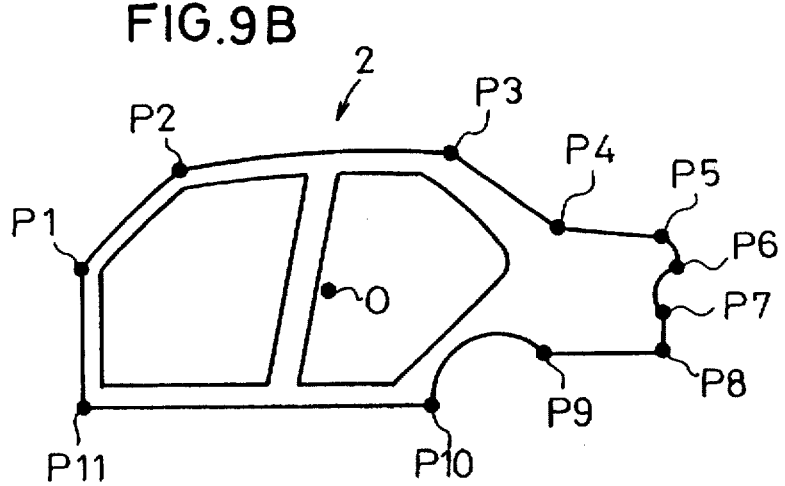
FIG. 9B is a diagram illustrating feature points on a reference product shape at the same scale as the new product shape shown in FIG. 9A.
Figure 10:
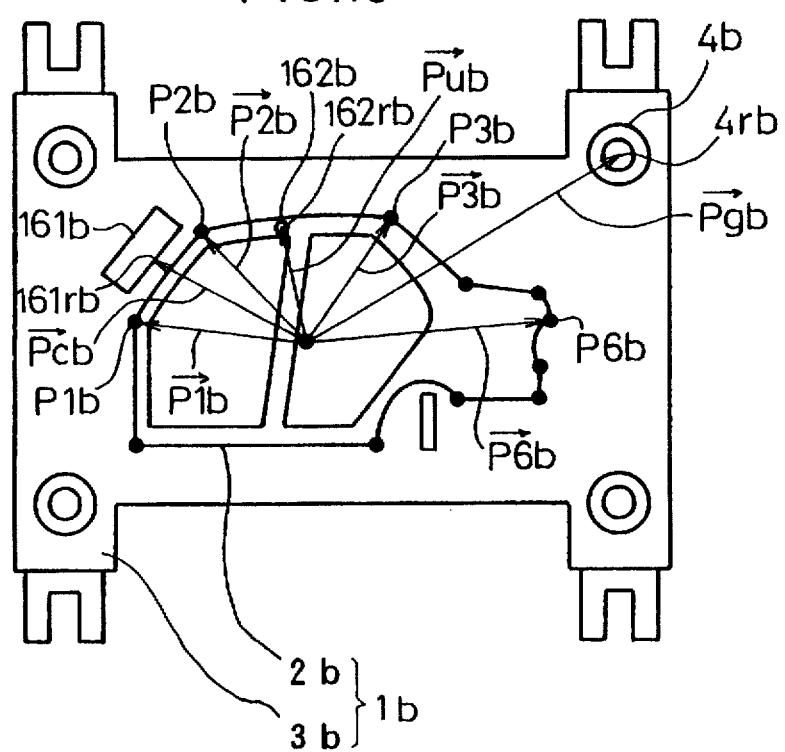
FIG. 10 is a diagram illustrating a method of generating die structure section data for a new product shape.

FIG. 9B shows the product shape forming section 2 generated by the reference product shape data Da, the product shape forming section 2 being shown at the same scale as the new product shape forming section 2b shown in FIG. 9A.

Thereafter, feature points P1b~P11b corresponding to the respective feature points P1~P11 generated on the product shape forming section 2 are generated on the new product shape forming section 2b in a step S9.

Finally, new die structure section data Dcb are generated in a step S10. Specifically, the new die structure section data Dcb are generated simply by replacing the coordinates of the feature points P1~P11 in the reference die structure section data Dca with the coordinates of the respective feature points P1b~P11b.

For example, in the reference die structure section data Dca, the vector Pg representing the guide post 4 is expressed by the above equation (1).

A vector Pgb having a start point at the origin O and an end point at a part origin 4rb of a guide post 4b (see FIG. 10) in the new die structure section data Dcb is expressed by the following equation (4):

$$\text{Vector } Pgb = \text{vector } P6bx + \text{vector } a + \text{vector } P3by + \text{vector } b. \quad (4)$$

In the equation (4), the constant vectors a, b are identical to those in the equation (1), and the vectors P6bx, P3by are X and Y components, respectively, of vectors P6b, P3b which have respective end points at the feature points P6b, P3b of the new product shape.

Similarly, a vector Pcb representing a cam 161b and a vector Pub representing a urethane spring 162b are represented by the following equations (5), (6), respectively:

Vector $P_{cb}$=vector $P1b$+(vector $P2b$−vector $P1b$)/2+vector $b'$, (5)

Vector $P_{ub}$=vector $P2b$+β(vector $P3b$−vector $P2b$)+vector $c$. (6)

According to the equations (4)–(6), the positions of the guide post 4b, the cam 161b, and the urethane spring 162b in the new die structure section data Dcb which indicate the positions of the parts of a die structure section 3b of the new die structure 1b (see FIG. 10) are established as data represented by relative dimensions with the new feature points (P3b, P6b), (P1b, P2b), (P2b, P3b) used as reference points.

In principle, the original die parts including the guide post 4, the cam 161, the urethane spring 162, and the scrap cutter 163 are directly used as the die parts including the guide post 4b, the cam 161b, the urethane spring 162b, and the scrap cutter 163b, and only those parts whose dimensions do not match desired dimensions are replaced with other parts, i.e., die parts of smaller dimensions. In this fashion, the number of steps of generating the new die structure section data Dcb can be reduced. With the die parts used as standard parts, the cost of the die can be reduced. The reduced number of die parts is effective to lower the cost required to manage and store the die parts.

Figure 11A:
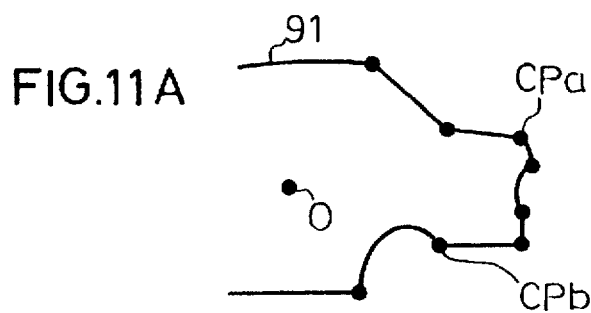
FIG. 11A is a diagram illustrating feature points generated on a product shape in a method of generating die structure section data according to the present invention.
Figure 11B:
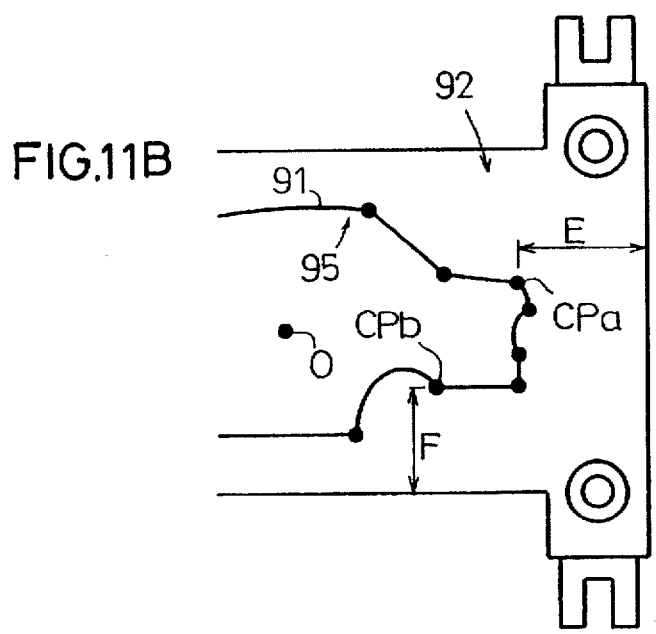
FIG. 11B is a diagram illustrating dimensions of a die structure section using the feature points shown in FIG. 11A as reference points.
Figure 11C:
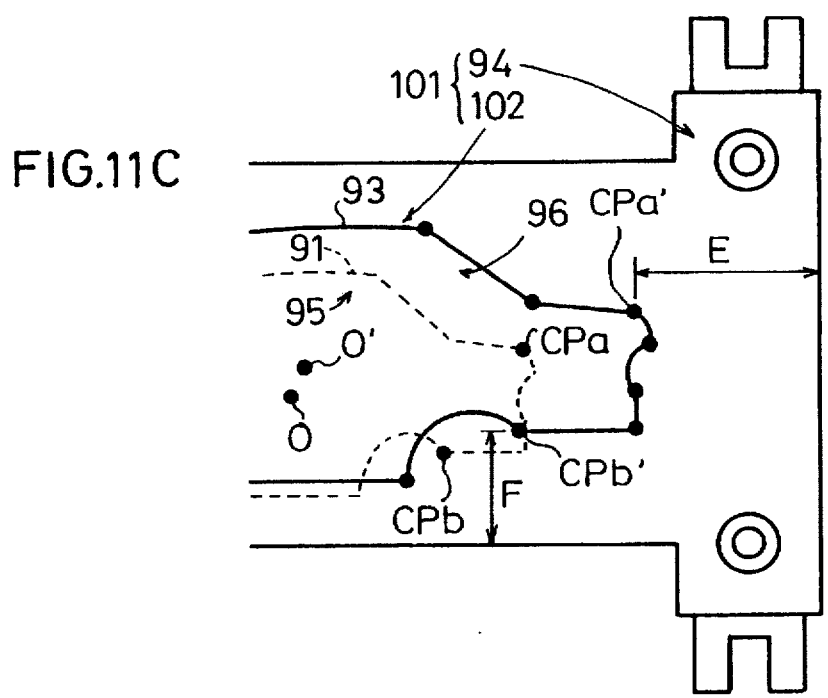
FIG. 11C is a diagram illustrating the generation of a new die structure section corresponding to a new product shape in the method of generating die structure section data according to the present invention.

In the above method according to the present invention, as shown in FIG. 11A, feature points CPa, CPb are generated on an outer shape definition line 91 which represents the size of a reference product shape, so that the dimensions of the product can be recognized. Then, as shown in FIG. 11B, dimensions E, F representing the shape and size of a die structure section 92 are expressed by positional relationships, e.g., dimensions or relationship equations, with the feature points CPa, CPb used as reference points. Finally, for generating die structure section data of a product shape similar to the reference product shape, as shown in FIG. 11C, the positional relationships between corresponding feature points CPa', CPb' on an outer shape definition line 93 representing the size of the new product and corresponding points on a new die structure section 94 are set to the above dimensions E, F. In this manner, the die structure section data of a product shape similar to the reference product shape can automatically be generated while keeping the correlation between the die sizes.

The positional relationship between feature points CPa', CPb' on a new product shape forming section 102 and the new die structure section 94 is maintained as being equal to the positional relationship between feature points CPa, CPb in a reference product shape forming section 95 and the reference die structure section 92, and only the new product shape forming section 102 is enlarged or reduced in its entire size or its vertical and horizontal dimensions are independently varied.

In the conventional arrangements, all the dimensions of the die structure section 92 are defined as absolute dimensions from the origin O, and the relative relationship between the die structure section 92 and the reference product shape forming section 95 is not expressed. Therefore, if the product shape is changed, then it is necessary to vary the dimensions at 2000 or more locations on one die.

According to the present invention, however, the die structure section 92 and the reference product shape forming section 95 are related to each other by indicating the relative positional relationship (relative dimensions) therebetween with the feature points used as reference points. Since the know-how of a die designing process can be described by dimensions and equations (relationship equations), if the product shape is changed, then only the dimensions relative to the feature points may be varied. This definition considerably simplifies the maintenance of the die structure.

Specifically, when the product shape is changed, a die structure can be designed by only changing feature points, without modifying the absolute dimensions relative to the die structure. Consequently, die structure section data can simply and easily be generated in a short period of time. Stated otherwise, when new structure section (e.g., new die structure section) data are to be generated, since reference structure section (e.g., reference die structure section) data which have been generated in advance are used, it is possible to greatly reduce the number of generating steps as compared with a process of generating new structure section (e.g., new die structure section) data directly from new product shape data.

For generating new structure section data corresponding to new product shape data, the positional relationship between feature points on a new product shape forming section and a new structure section is maintained as being substantially equal to the positional relationship between feature points in a reference product shape forming section and a reference structure section, and only the product shape forming section is enlarged or reduced in its entire size or its vertical and horizontal dimensions are independently varied. Therefore, the reference structure section data which have been generated in advance can be used substantially directly as new structure section data. If the positional relationship is described as dimensions or relationship equations, the arrangement of data can visually be recognized.

Similarity required between a reference product shape and a new product shape may be such that they are both "four-door automobiles," for example. Die structure section data for a small-size four-door automobile, for example, may thus be used as reference die structure section data for new die structure section data of a middle-size four-door automobile or a light four-door automobile which has an engine displacement different from that of the small-size four-door automobile. For these automobile types, die structure section data may be generated with the same number of feature points. Actually, 70–80 percent of new die structure section data can automatically be generated by the method according to the present invention, whereas data is only needed to be entered again or corrected slightly for the remaining 20–30 percent of the new die structure section data.

In the above embodiment, the product shape section comprises the product shape forming section 2 for pressing a sheet-like workpiece to a predetermined product shape, and the structure section comprises the die structure section 3 which holds the product shape forming section 2. However, the present invention is not limited to such product shape section and structure section.

If the product shape section is an automobile body, then the structure section may be considered to be an assembling jig for assembling the automobile body or a welding jig for welding the automobile body. In such a case, new assembling or welding jig position data with respect to a new automobile body can be generated from reference product shape section data which have been generated in advance as relative position data with respect to feature points on a reference automobile body and positional data of feature points on the new automobile body.

The method according to the present invention may also be applied to the generation of jig position data for a performance tester for testing an automobile body. Specifically, new jig position data for a performance tester for testing a new automobile body can be generated from jig position data for a performance tester which have been generated with respect to feature points on a reference automobile body.

Furthermore, the method according to the present invention may be applied to the designing of an automobile body. For example, if various portions of an automobile body are designed with respect to a main chassis, then when a new main chassis is produced, various automobile body portions corresponding to the new main chassis can easily be designed. The method according to the present invention may also be applied to the designing of optional parts including a roof rail, a door visor, etc.

An operation sequence of a method according to another embodiment of the present invention will be described below with reference to FIG. 12. The operation sequence shown in FIG. 12 is performed primarily under the control of the computer 23 shown in FIG. 1. For an easier understanding of the operational sequence shown in FIG. 12, it is assumed that intermediate structure shape design data are lost foam pattern shape design data with a finishing allowance, and that a lost foam pattern is an original pattern for casting a pressing die for forming an outer side panel of an automobile. Specifically, a lost foam pattern for a pressing die is defined as a final structure (which corresponds to the reference die structure 1 shown in FIG. 5 from which the die parts including the guide posts 4, the scrap cutter 163, the cam 161, and the urethane spring 162 are removed, and a lost foam pattern which comprises the final structure with a finishing allowance added thereto is defined as an intermediate structure.

Cutter path data to be generated in this method are therefore cutter path data for machining, with a machine tool, an intermediate structure manufactured from intermediate structure shape design data into a desired final structure.

Design data for designing a pressing die are generated by the CAD/CAM system 11 or another CAD system in a step S11. The design data for designing a pressing die which are generated by the other CAD system, e.g., the die structure data Da to which finishing marks, etc. are assigned, are read from the host computer 21. The design data for designing a pressing die can be used as three-dimensional shape design data for designing a lost foam pattern as a final structure, except for data as to a material.

Figure 13:
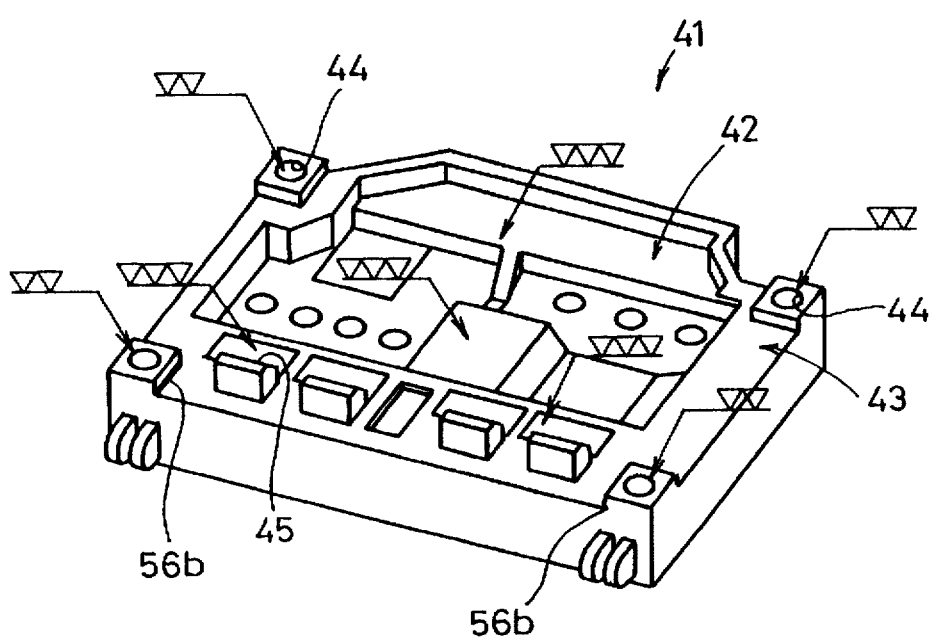
FIG. 13 is a perspective view of a structure.

FIG. 13 shows a die structure 41 (which is not the same as the die structure shown in FIG. 5) based on three-dimensional shape design data which are the design data for designing a pressing die, the die structure 41 is displayed on the graphic display unit 26. The die structure 41 is displayed together with finishing marks based on finishing mark data indicative of surface finish levels. Specifically, the surface finish level for a surface that is indicated by the arrow is represented by a number of triangular marks (▽) as a finishing mark. A mark indicative of surface roughness may be used instead of the triangular marks. Those surfaces to which no triangular marks are assigned are surfaces for which no finishing accuracy is prescribed.

The die structure 41 shown in FIG. 13 represents a lower die member of the pressing die. The die structure 41 basically comprises a product shape forming section 42 for shaping a workpiece of sheet steel to a desired product shape, and a die structure section 43 holding the peripheral edge of the product shape forming section 42. The die structure section 43 has guide post holes 44 for inserting respective guide posts on an upper die member of the pressing die and cams 45 for forming bent portions on the workpiece.

Then, surfaces which need to be machined are specified in a step S12. The surfaces which need to be machined can easily be specified because they are surfaces to which finishing marks are assigned.

Attribute information is automatically or manually given to each of the specified surfaces which need to be machined in a step S13. The attribute information which is automatically given may, for example, represent a finishing allowance, and the attribute information which is manually given may, for example, represent a dimensional tolerance after a finishing allowance is machined. The attribute information representing a dimensional tolerance may be automatically given. As described later on, positions for dividing a rib are automatically indicated, and cutter path data for the rib are automatically generated. Furthermore, when corners are indicated by attribute information, molten metal flow slots are automatically produced in the corners. The direction in which a finishing allowance is to be machined by a cutter may automatically or manually be indicated.

Figure 14A:
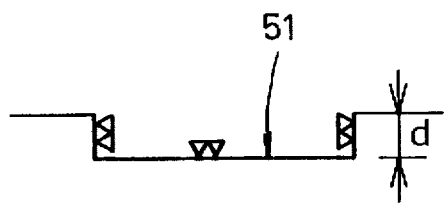
FIG. 14A is a cross-sectional view of a structure having a relatively shallow groove with finishing marks.
Figure 14B:
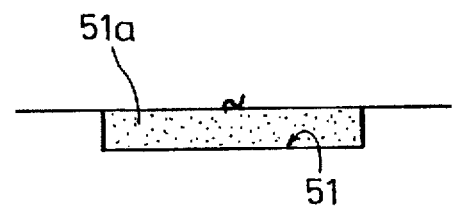
FIG. 14B is a cross-sectional view of the structure shown in FIG. 14A, with a finishing allowance added to the relatively shallow groove.
Figure 14C:
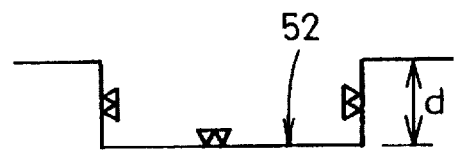
FIG. 14C is a cross-sectional view of a structure having a relatively deep groove with finishing marks.
Figure 14D:
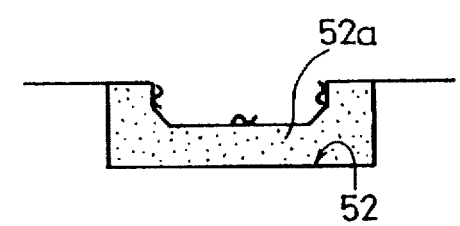
FIG. 14D is a cross-sectional view of the structure shown in FIG. 14C, with a finishing allowance added to the relatively deep groove.

The step S13 will be described in specific detail below. A groove 51 (see FIG. 14A) having a relatively small depth d, to which finishing marks each represented by two triangular marks are assigned, is given a finishing allowance 51b lying flush with a die structure surface, as shown stippled in FIG. 14B, in view of the length and diameter of a cutter such as an end mill or the like. A groove 52 (see FIG. 14C) having a relatively large depth d is given a finishing allowance 52a shaped complementarily to the wall surface of the groove 52, as shown stippled in FIG. 14D. In the manner, different finishing allowances 51a, 52a are given to the respective grooves 51, 52 depending on the depth d thereof for preventing the cutter from being broken due to an undue load imposed thereon. The finishing allowances 51a, 52a in the grooves 51, 52 are machined in a direction normal to the sheet of FIGS. 14A through 14D.

Figure 15A:
FIG. 15A is a cross-sectional view of a structure having a trapezoidal land.
Figure 15B:
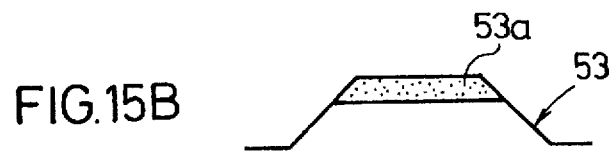
FIG. 15B is a cross-sectional view of the structure shown in FIG. 15A, with a trapezoidal finishing allowance added to the trapezoidal land.
Figure 15C:
FIG. 15C is a cross-sectional view of a structure having a rectangular portion on a trapezoidal land.
Figure 15D:
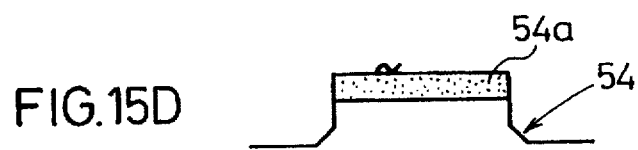
FIG. 15D is a cross-sectional view of the structure shown in FIG. 15C, with a rectangular finishing allowance added to the rectangular portion on the trapezoidal land.
Figure 15E:
FIG. 15E is a cross-sectional view of a structure having a rectangular portion on a trapezoidal land with substantially arcuate sides.
Figure 15F:
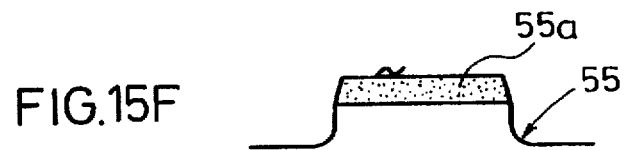
FIG. 15F is a cross-sectional view of the structure shown in FIG. 15C, with a trapezoidal finishing allowance added to the rectangular portion on the trapezoidal land with substantially arcuate sides.

An upper surface of a trapezoidal land 53 (see FIG. 15A) with tapered sides is given a trapezoidal finishing allowance 53a with its tapered sides aligned with the tapered sides of the trapezoidal land 53, as shown stippled in FIG. 15B. An upper surface of a rectangular portion 54 (see FIG. 15C) on a trapezoidal land is given a rectangular finishing allowance 54a as shown stippled in FIG. 15D. An upper surface of a rectangular portion 55 (see FIG. 15E) on a trapezoidal land with substantially arcuate sides is given a trapezoidal finishing allowance 55a as shown stippled in FIG. 15F. The added trapezoidal finishing allowance 53a shown in FIG. 15B is effective to reduce the material (foamed polystyrene) of the lost foam pattern as compared with a rectangular finishing allowance which has heretofore been added. The trapezoidal finishing allowance 55a shown in FIG. 15F is added intentionally for the purpose of reducing a load which will be applied to a cutter in a subsequent machining process.

Figure 16A:
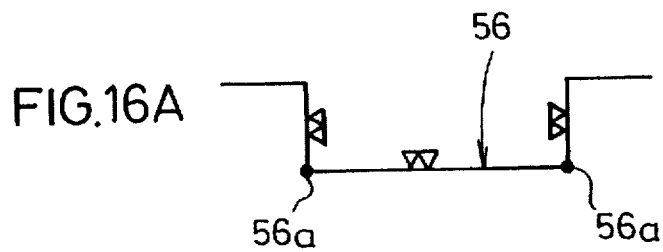
FIG. 16A is a cross-sectional view of a structure having a groove with finishing marks.
Figure 16B:
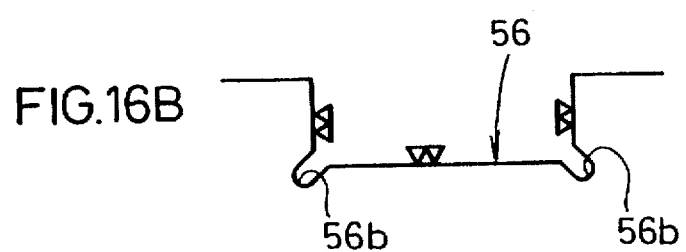
FIG. 16B is a cross-sectional view of the structure shown in FIG. 16A, with molten metal flow slots defined in corners of the groove.
Figure 16C:
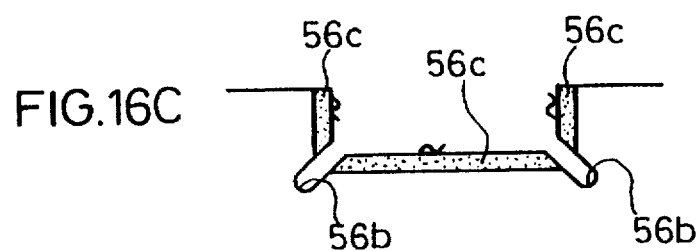
FIG. 16C is a cross-sectional view of the structure shown in FIG. 16B, with finishing allowances added to the groove.

If corners 56a are indicated in a groove 56 (FIG. 16A), then molten metal flow slots 56b (see also FIG. 13) shown in FIG. 16B are defined in the corners 56a, and thereafter a finishing allowance 56c is given to the groove 56 as shown in FIG. 16C.

Figure 17:
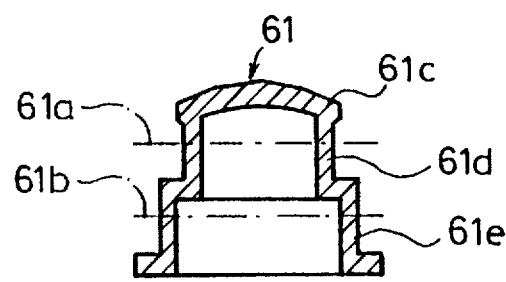
FIG. 17 is a cross-sectional view of a rib with divisional position indicator lines.

FIG. 17 shows a substantially cylindrical hollow rib 61 which comprises a stack of successive hollow cylinders having different diameters. Finishing allowances given to the rib 61 are complex and omitted from illustration. To allow an NC machine tool to machine the rib 61 with ease, positions for dividing the rib 61 are indicated by division planes 61a, 61b, and the rib 61 is divided into three segments 61c, 61d, 61e along the division planes 61a, 61b.

Figure 18A:
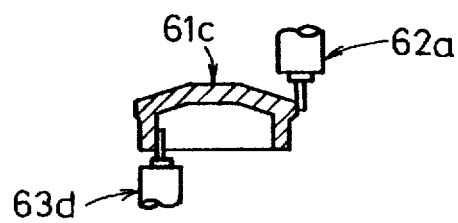
FIG. 18A is a cross-sectional view illustrating the generation of cutter path data with respect to an upper segment of the rib.
Figure 18B:
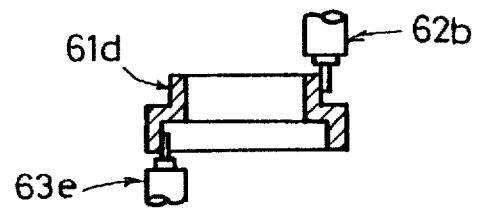
FIG. 18B is a cross-sectional view illustrating the generation of cutter path data with respect to a middle segment of the rib.
Figure 18C:
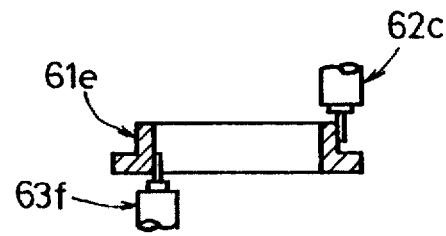
FIG. 18C is a cross-sectional view illustrating the generation of cutter path data with respect to a lower segment of the rib.

As shown in FIGS. 18A through 18C, cutter path data for cutters 62a–62c, 63d–63f are automatically generated with respect to the divided segments 61c, 61d, 61e. When the segments 61c, 61d, 61e are to be machined by the cutters 63d–63f, the segments 61c, 61d, 61e are turned upside down and mounted on the machining table of an NC machine tool (not shown).

Since the rib 61 is made of foamed polystyrene, the segments 61c, 61d, 61e which have been machined by the NC machine tool can be bonded into the rib 61 by an adhesive applied to the surfaces of the segments 61c, 61d, 61e divided along the division planes 61a, 61b.

Thereafter, it is confirmed whether attribute information representing a finishing allowance or the like is assigned to all the surfaces that need to be machined. Then, the assignment of attribute information in the step S13 is finished in a step S14.

Then, the surfaces to be machined to which attribute information is assigned are classified in a step S15. The classifying step is carried out because all surfaces to be machined with the same finishing mark assigned thereto can successively be machined by cutters of the same diameter, thus shortening the time required to machine these surfaces. When a surface is machined by a scanning end mill having a small diameter, the height of the remaining machined surface is relatively small and the surface is finished accurately. When a surface is machined by a scanning end mill having a large diameter, the height of the remaining machined surface is relatively large and the surface is finished roughly.

Figure 19:
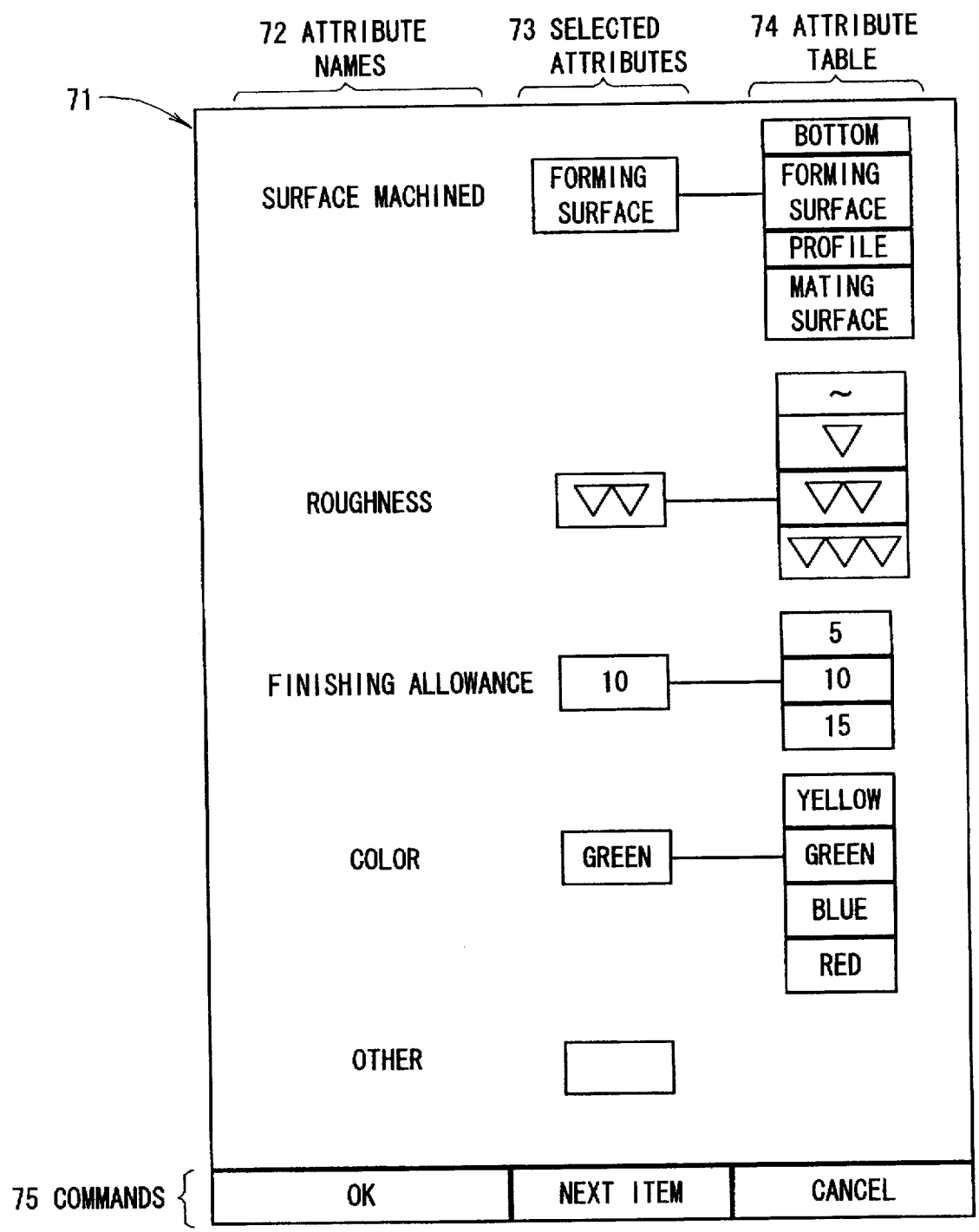
FIG. 19 is a view of a screen image of a classification window.

The surfaces are classified using a screen image of a classification window as follows:

FIG. 19 shows a screen image of a classification window (also referred to as an attribute classification assigning and editing window) 71. The die structure 41 shown in FIG. 13 is displayed in the background in the screen image though it is not shown in FIG. 19.

In FIG. 19, attribute names 72 representing "SURFACE MACHINED," "ROUGHNESS," "FINISHING ALLOWANCE," "COLOR," and "OTHER" (undefined) are displayed in a left-hand column of the screen image. An attribute table 74 representing specific attributes that can be selected for the attributes is displayed in a right-hand column of the screen image. Selected attributes 73 representing attributes which are selected from the attribute table 74 using the mouse 33 or the like are displayed in a central column of the screen image. The attribute name "COLOR" in the attribute names 72 actually indicates a displayed color because a color CRT is used as the graphic display unit 26. The attribute "FORMING SURFACE" in the attribute table 74 which corresponds to the attribute name "SURFACE MACHINED" in the attribute names 72 represents a surface which has the product shape forming section 42 of the die structure 41 shown in FIG. 13. The attribute "BOTTOM" in the attribute table 74 represents a surface which is on the reverse side of the surface having the product shape forming section 42, and which will be attached to a pressing machine (not shown). The attribute "PROFILE" in the attribute table 74 represents a member such as a rib 16 shown in FIG. 17 or the like, and the attribute "MATING SURFACE" in the attribute table 74 represents a guide post hole 44 or the like. Commands 75 displayed in a lower column of the screen image include "OK" representing the end of the screen image, "NEXT" representing a next item (next page), and "CANCEL" representing cancellation of the screen image. These commands 75 may be selected by the mouse 33 or the like.

For example, the classification window shown in FIG. 19 is processed as follows: The attribute "FORMING SURFACE" is selected for the surface machined, the attribute "$\nabla\nabla$" is selected for the roughness, the attribute "10" is selected for the finishing allowance, and the attribute "GREEN" is selected for the color. Thereafter, the command "NEXT" is selected. Then, the attribute "FORMING SURFACE" is selected for the surface machined, the attribute "$\nabla$" is selected for the roughness, the attribute "5" is selected for the finishing allowance, and the attribute "YELLOW" is selected for the color, after which the command "NEXT" is selected. Finally, the command "NEXT" is selected, and the attribute "FORMING SURFACE" is selected for the surface machined, the attribute "$\nabla\nabla\nabla$" is selected for the roughness, the attribute "15" is selected for the finishing allowance, and the attribute "BLUE" is selected for the color, after which the command "OK" is selected.

Figure 20:
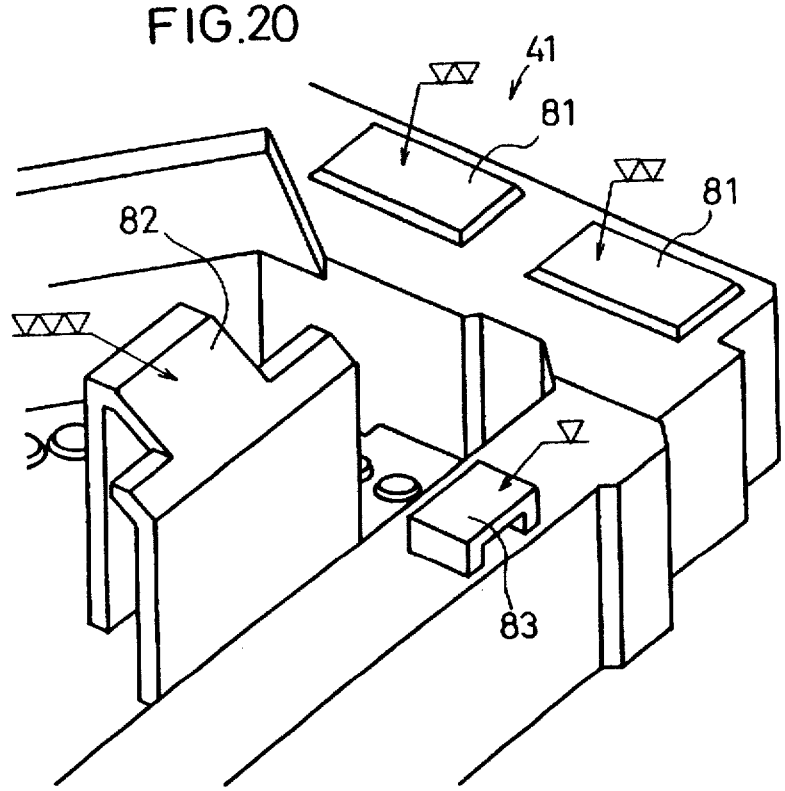
FIG. 20 is an enlarged fragmentary perspective view of a final structure.
Figure 21:
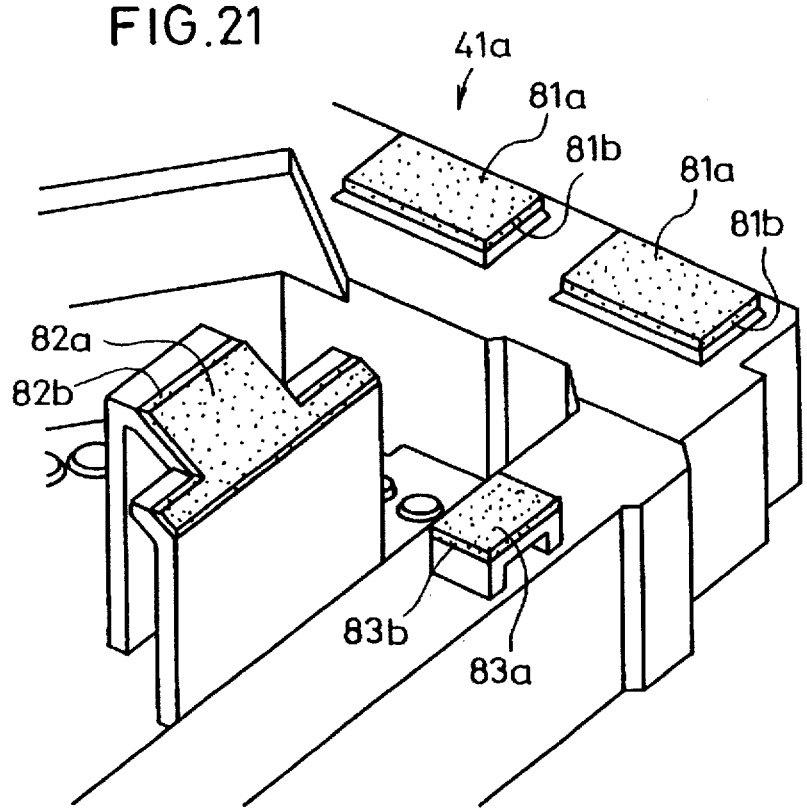
FIG. 21 is an enlarged fragmentary perspective view of an intermediate structure.

To an image of a die structure 41 shown in FIG. 20, there are now given finishing allowances at classified surfaces or regions to be machined as shown in FIG. 21, allowing the operator to visually recognize an image of the die structure to which such finishing allowances are given, in a step S16.

Specifically, the die structure 41 is shown in FIG. 20, which is not identical to the die structure 41 shown in FIG. 13, and a die structure 41a with finishing allowances 81b, 82b, 83b added thereto is shown in FIG. 21. Plate placing surfaces 81 of the die structure 41, each indicated by a finishing mark $\nabla\nabla$ in FIG. 20, are automatically drawn as plate placing surfaces 81a to which finishing allowances 81b of 10 mm (the finishing allowances 81b are displayed in green) are added, in the die structure 41a in FIG. 21. A seat surface 83 indicated by a finishing mark $\nabla$ in FIG. 20 is automatically drawn as a guide post circumferential abutting surface 83a to which a finishing allowance 83b of 5 mm (the finishing allowance 83b is displayed in yellow) is added, in the die structure 41a in FIG. 21. A cam surface 82 indicated by a finishing mark $\nabla\nabla\nabla$ in FIG. 20 is automatically drawn as a cam surface 82a to which a finishing allowance 82b of 20 mm (the finishing allowance 82b is displayed in blue) is added, in the die structure 41a in FIG. 21.

If necessary, attributes may be extracted, and outputted for display on the screen image, stored in a file, or defined in a program of macro commands. Specifically, as shown in FIG. 22, an attribute extraction window 85 is opened in a screen image. Then, "ROUGHNESS" is entered in an attribute name box 86, "$\nabla\nabla$" in an attribute value box 87, "MATCHED" in a status box 88, and "and" in a condition box 89. Then, a macro definition box 90 is clicked, putting a mark "x" in the macro definition box 90. Thereafter, "OK" of the commands 75 is clicked, whereupon a macro program for extracting all surfaces to be machined which match the finishing mark "$\nabla\nabla$" is defined.

Then, cutter path data for a predetermined cutter are automatically generated with respect to the die structure 41a (FIG. 21) with finishing allowances added thereto. It is thereafter determined in a step S18 whether the die structure 41a is in physical interference with the cutter head of a non-illustrated NC machine tool. If they are interfering with each other, then a corrective action is taken as by replacing the cutter with a new cutter on an interactive basis with the screen image. Cutter path data are generated again with the new cutter in the step S17.

The above process from the step of giving finishing allowances to the step of generating cutter path data will be described below with reference to FIGS. 23A through 23D.

Figure 23A:
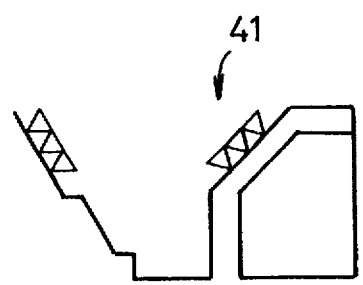
FIG. 23A is a cross-sectional view of a structure with finishing marks.
Figure 23B:
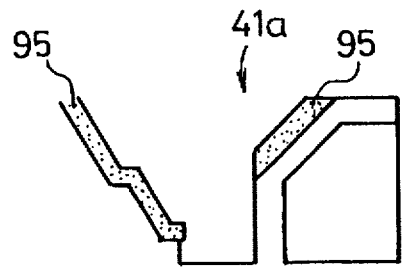
FIG. 23B is a cross-sectional view of the structure shown in FIG. 23A, with finishing allowances added thereto.
Figure 23C:
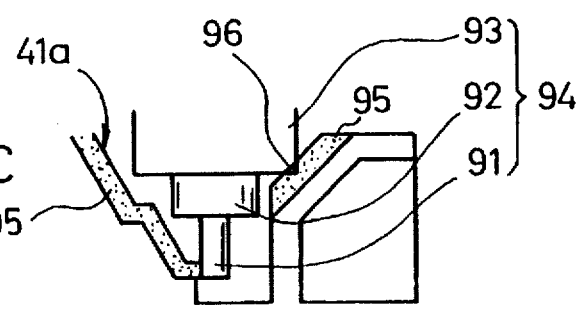
FIG. 23C is a cross-sectional view showing the manner in which physical interference between the structure with the finishing allowances added thereto and a cutter is confirmed.
Figure 23D:
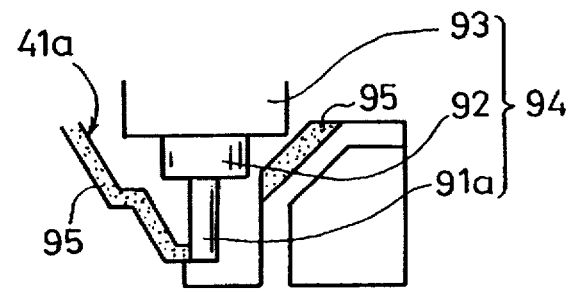
FIG. 23D is a cross-sectional view showing a cutter whose length has been increased as a result of the confirmed physical interference.

As shown in FIG. 23A, a surface finish is indicated on a die structure 41 by a finishing mark $\nabla\nabla\nabla$. Then, as shown in FIG. 23B, finishing allowances 95 are given to the die structure 41, producing a die structure 41a with finishing allowances. Thereafter, as shown in FIG. 23C, a physical interference is confirmed on a screen image in order to generate cutter path data for a cutter head 94 which comprises a cutter 91, a chuck 92 for holding the cutter 91, and a holder 93 for securing the chuck 92, with respect to the die structure 41a. In FIG. 23C, it is visually recognized that the holder 93 of the cutter head 94 is interfering with one of the finishing allowances 95 of the die structure 41a at an interfering point 96 which is displayed in red, for example. If an interference occurs while cutter path data are being generated, then a warning may be issued by a buzzer or a speech signal in addition to the colored display of the interfering point 96 as shown in FIG. 23C.

When the interference occurs as shown in FIG. 23C, the operator replaces the cutter 91 with a longer cutter 91a (see FIG. 23D), and then confirms again the cutter head 94 for any interference. In this manner, cutter path data for the cutter 91a with respect to the die structure 41a can be generated substantially automatically. The generated cutter path data can easily be converted into NC machining data for the NC machine tool as well known in the art.

Now, an overall process from the start of designing a lost foam pattern as a structure to the actual manufacture of such a lost foam pattern will be described with reference to FIG. 24 in comparison with the conventional process, when necessary. FIG. 24 shows the conventional process of designing, manufacturing, and inspecting a structure which comprises a lost foam pattern, and the general sequence of the conventional process shown in FIG. 24 is roughly the same as the that of the process according to the present invention though detailed steps thereof differ from those of the overall process according to the present invention. For the sake of brevity, the operation sequence of the overall process according to the present invention will be described below with reference to FIG. 24.

In the die designing step S101, the production technology developing department generates design data (final lost foam pattern shape design data) for designing a pressing die, including data on finishing marks indicating surface finishes, according to the conventional process. In the process according to the present invention, however, all the processes shown in FIG. 12 are carried out in the production technology developing department. Therefore, not only final lost foam pattern shape design data, but also intermediate lost foam pattern shape design data including finishing allowances and cutter path data after they have been checked for interference, are generated. Dimensional tolerances after the finishing allowances are machined are also added.

In the process according to the present invention, therefore, the steps S101, S102 are carried out by the same CAD/CAM system 11.

In the step S103, a final lost foam pattern with finishing allowances, i.e., an intermediate lost foam pattern, is produced with reference to drawings based on the intermediate structure shape design data referred to above. In the step S104, the intermediate lost foam pattern which has been delivered is inspected. Since the actual intermediate lost foam pattern is compared with the drawings which contain known finishing allowances, the time required to inspect the intermediate lost foam pattern in this step is short.

In the step S105, the intermediate lost foam pattern is finished by an NC machine tool using the cutter path data generated in the die designing step S101, thereby producing a final lost foam pattern.

Inasmuch as the cutter path data contain finishing allowances, there is no interference occurring between the cutter head and the lost foam pattern with the finishing allowances, i.e., the intermediate lost foam pattern.

The dimensions of the final lost foam pattern produced by the NC machine tool are manually measured by the operator with a three-dimensional measuring machine or the like. Thereafter, the measured dimensions are entered into the CAD/CAM system 11, which compares the measured dimensions with the dimensional tolerances of the final lost foam pattern shape design data which have been generated at first in the production technology developing department, for automatically determining whether the measured dimensions fall within the dimensional tolerances.

Using the lost foam pattern as the final die structure as an original pattern, a sand mold is produced, and a molten metal is poured into the sand mold. The lost foam pattern is eliminated, and a casting mold is completed and at the same time a first casting is produced. The produced casting will be used as a pressing die for forming an outer side panel of an automobile.

In the above process according to the present invention, design data for designing a final structure shape with respect to which finishing allowances are given to certain surfaces of all surfaces of a final structure to which finishes are indicated, are generated in the CAD/CAM system 11 in the step S13 (see FIG. 12), and the final structure with the finishing allowances added thereto is checked for interference with the cutter in the CAD/CAM system 11, for thereby producing final structure shape design data including finishing allowances as intermediate structure shape design data which are free of interference with the cutter in the steps S17~S19.

Consequently, when the finishing allowances of an intermediate structure produced based on the intermediate structure shape design data are machined by the NC machine tool, no physical interference occurs between the intermediate structure and the cutter.

Since the CAD/CAM system 11 which has generated the design data for designing a final structure shape generates the final structure shape design data including finishing allowances in the step S13, human errors, e.g., errors in entering dimensions for giving finishing allowances, are prevented from being introduced. Because the probability of input errors is lowered, the probability that some difficulties will occur in subsequent processes is also lowered, resulting in a reduction in the overall manufacturing costs.

Stated otherwise, inasmuch as data required in downstream steps are generated in upstream steps, operation in subsequent steps which are the downstream steps can smoothly be carried out.

If an intermediate structure is a lost foam pattern with finishing allowances, then the time required from the designing of the lost foam pattern until the lost foam pattern is actually manufactured is considerably shortened.

In the inspecting step S106, the measured dimensions and the tolerances are automatically compared with others. Therefore, the number of steps included in the inspecting step S106 is much smaller than the conventional visually verifying steps.

Although certain preferred embodiments of the present invention have been shown and described in detail, it should be understood that various changes and modifications may be made therein without departing from the scope of the appended claims.

What is claimed is:

1. A method of generating data for designing a structure section of a structure, which comprises a product shape section and the structure section, with a computer-aided design/computer-aided manufacturing system, comprising the steps of:

generating reference structure section data representing a positional relationship between a plurality of feature points as reference points in a reference product shape section and a predetermined location in a reference structure section; and replacing coordinates of the reference points in the reference structure section data with coordinates of feature points in new product shape data which correspond respectively to feature points in the reference product shape section, and establishing the reference structure section data after the coordinates of the reference points therein are replaced, as new structure section data when the new structure section data corresponding to new product shape data are to be generated.

2. A method according to claim 1, wherein said product shape section comprises a product shape forming section, said structure section comprises a die structure section, and said structure comprises a die structure.

3. A method according to claim 1, wherein said positional relationship is described by dimensions or a relationship equation.

4. A method according to claim 1, wherein a positional relationship between the feature points in said new product shape data and a new structure section is maintained as being equal to a positional relationship between feature points in said reference product shape section and said reference structure section, and only said product shape section is enlarged or reduced in entire size or its vertical and horizontal dimensions are independently varied.

5. A method according to claim 1, wherein a positional relationship between the feature points in said new product shape data and a new structure section is maintained as being equal to a positional relationship between feature points in said reference product shape section and said reference structure section, and only said product shape section is enlarged or reduced in its entire size or its vertical and horizontal dimensions are independently varied, and wherein said positional relationship is described by dimensions or a relationship equation.

6. A method according to claim 1, wherein a positional relationship between the feature points in said new product shape data and a new structure section is maintained as being equal to a positional relationship between feature points in said reference product shape section and said reference structure section, and only said product shape section is enlarged or reduced in entire size or its vertical and horizontal dimensions are independently varied, and wherein said product shape section comprises a product shape forming section, said structure section comprises a die structure section, and said structure comprises a die structure.

7. A method according to claim 1, wherein a positional relationship between the feature points in said new product shape data and a new structure section is maintained as being equal to a positional relationship between feature points in said reference product shape section and said reference structure section, and only said product shape section is enlarged or reduced in its entire size or its vertical and horizontal dimensions are independently varied, wherein said positional relationship is described by dimensions or a relationship equation, and wherein said product shape section comprises a product shape forming section, said structure section comprises a die structure section, and said structure comprises a die structure.

* * * * *